(12) United States Patent
Gregory et al.

(10) Patent No.: US 8,701,901 B2
(45) Date of Patent: Apr. 22, 2014

(54) SHELVING SYSTEM AND COMPONENTS

(75) Inventors: Michael Gregory, Huntersville, NC (US); Robert John Warner, Jr., Cornelius, NC (US); Jean-Luc Camarda, Quebec (CA); Edgar Montague, Charlotte, NC (US); Kurt Rampton, Charlotte, NC (US)

(73) Assignee: Rubbermaid, Inc., Huntersville, NC (US)

( * ) Notice: Subject to any disclaimer, the term of this patent is extended or adjusted under 35 U.S.C. 154(b) by 283 days.

(21) Appl. No.: 13/204,279

(22) Filed: Aug. 5, 2011

(65) Prior Publication Data
US 2013/0032559 A1 Feb. 7, 2013

(51) Int. Cl.
*A47F 5/08* (2006.01)
(52) U.S. Cl.
USPC .............. 211/113; 108/149; 108/42; 211/187
(58) Field of Classification Search
USPC ................ 108/42, 47, 48; 211/118, 113, 134, 211/85.29, 117, 86.01, 149, 151, 180; 312/245
See application file for complete search history.

(56) References Cited

U.S. PATENT DOCUMENTS

| | | | | |
|---|---|---|---|---|
| 2,206,753 A * | 7/1940 | Roth | ............................. | 108/164 |
| 2,582,385 A * | 1/1952 | Knudsen | ....................... | 182/113 |
| 3,025,970 A * | 3/1962 | Ostrom | .......................... | 108/96 |
| 3,799,072 A * | 3/1974 | Slaboden | ...................... | 108/107 |
| 3,904,258 A * | 9/1975 | Faulkenberry | .................... | 312/6 |
| 4,061,092 A * | 12/1977 | Jacobsen et al. | .............. | 108/149 |
| 4,187,787 A * | 2/1980 | Nakatsu | ........................... | 108/96 |
| 4,189,030 A * | 2/1980 | Leslie et al. | ................... | 182/196 |
| 4,295,432 A * | 10/1981 | Hulke | ............................ | 108/149 |
| 4,424,908 A * | 1/1984 | Davitz | ........................... | 211/118 |
| 4,523,526 A * | 6/1985 | O'Neill | .......................... | 108/149 |
| 4,537,451 A * | 8/1985 | Bredderman et al. | ............ | 312/6 |
| 4,726,317 A * | 2/1988 | Ritten et al. | ................... | 114/362 |
| 5,052,648 A * | 10/1991 | Landau | .......................... | 108/149 |
| 5,350,071 A * | 9/1994 | Pond | ............................ | 211/70.6 |
| 6,116,164 A * | 9/2000 | Justen, Jr. | ........................ | 108/42 |
| 6,145,678 A * | 11/2000 | Morrison | ....................... | 211/113 |
| 6,354,232 B1 * | 3/2002 | Hulke | ............................ | 108/149 |
| 6,637,609 B2 * | 10/2003 | Stevens | .......................... | 211/118 |

(Continued)

OTHER PUBLICATIONS

Michael Graves Design, Three Shelf Organizer, Model No. A-05614-0041-ST, picture taken Oct. 15, 2012.

(Continued)

*Primary Examiner* — Jose V Chen
(74) *Attorney, Agent, or Firm* — Matthew W. Witsil; Moore & Van Allen PLLC

(57) ABSTRACT

A shelving system including brackets and shelves suspended by straps from various types of shelving. One bracket for hanging shelves from straps from a solid surface shelf is provided. The bracket includes first and second legs and a connecting portion defining an opening for receiving the shelf. Another bracket for hanging shelves from straps from a wire shelf deck is provided. The bracket includes a plate with first and second edges bent in the same direction, and first and second substantially parallel slots in the plate receive a strap. A shelf for hanging from a plurality of straps is provided. The shelf includes a deck, which may include one or more materials, and a clamp mounted to the deck. A shelving system includes a bracket that engages a fixed shelf, a one strap depending from the bracket, and a shelf releasably attached to the at least one strap.

16 Claims, 28 Drawing Sheets

(56) References Cited

U.S. PATENT DOCUMENTS

| | | | | |
|---|---|---|---|---|
| 6,814,418 | B2 * | 11/2004 | D'Orso | 211/118 |
| 7,810,655 | B2 * | 10/2010 | Wang | 211/118 |
| 2009/0184077 | A1 * | 7/2009 | Curet et al. | 211/117 |

OTHER PUBLICATIONS

Neatfreak, Six Shelf Organizer, Model No. A-05662-03X1-D1EF, picture taken Oct. 15, 2012.

* cited by examiner

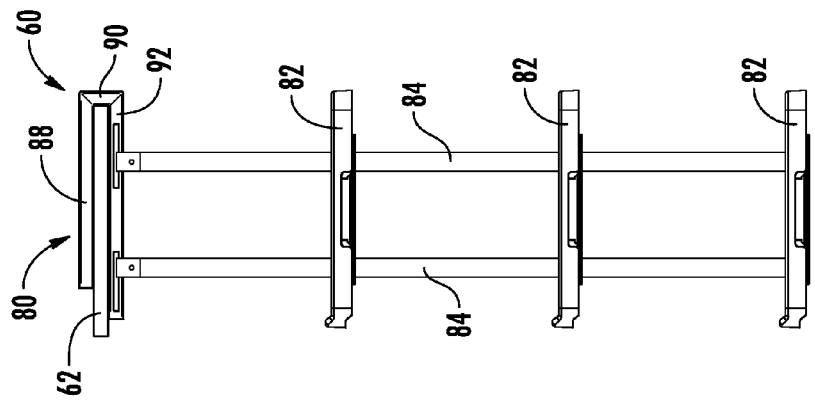
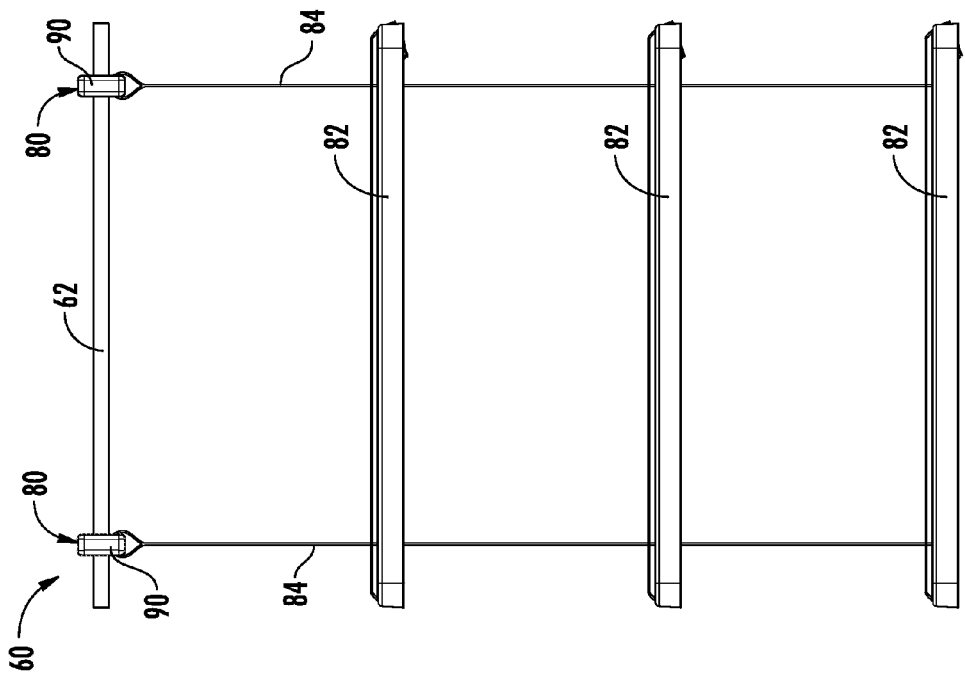

# SHELVING SYSTEM AND COMPONENTS

BACKGROUND

The system disclosed herein relates generally to the field of shelving, and particularly may relate to support of a structure hanging from shelving.

Installation of shelving generally requires tools, time, and some degree of skill by an installer. Such installation may also require changing existing shelving systems, which may be undesirable or not allowed in certain situations.

Conventional hanging organizers may be used as a solution for additional storage with shelving in a closet or other places where there is a rod for hanging articles, independent of mounting the shelving directly to a wall. Many hanging organizers attach to a hanger rod with hooks or one or more straps that may be attached with hook and loop fasteners. The organizers are often soft sided, being a three sided fabric enclosure with shelves in it accessible from the open side or a side that may be opened with a zipper. Because the organizers are generally centered from front to back on the hanger rod, there is a significant amount of unused space behind the organizer and in front of the wall, and the front of the organizer extends out into the room, which may impede traffic in front of the shelf. The shelving may be suspended from only two straps, which can lend to instability of the shelves. The shelves of soft sided organizers often deflect with just a small amount of weight on them, and may lack the ability to adjust the height of the shelves.

SUMMARY

In accordance with one embodiment described herein, a bracket for hanging a structure supported by one or more straps from a solid surface shelf is provided. The solid shelf may include front edge and a deck having a top and a bottom, and the bracket includes elongated first and second legs and a connecting portion. The elongated first leg and the elongated second leg each have a proximal end and a distal free end. The proximal end of the first leg and the proximal end of the second leg are both connected to the connecting portion. The first leg and second leg are substantially parallel and extend from the connecting portion in substantially the same direction to define an elongated opening. The opening is adapted to receive the front edge and a portion of the deck of the shelf.

In accordance with another embodiment described herein, a bracket for hanging a structure supported by one or more straps from a wire shelf deck is provided. The bracket includes a plate having a body and first edge parallel to and spaced from a second edge. The first and second edges are bent in the same direction relative to the body, and the body defines first and second substantially parallel slots adapted to receive a strap. The slots are substantially parallel to the first and second edges.

In accordance with another embodiment described herein, a shelf for hanging from a plurality of straps is provided. The shelf comprises a deck and a first clamp. The deck has a first end and a second end, and defines a plurality of slots adapted to allow the straps to pass through. The first clamp is mounted to the deck, and has a first position for engaging at least one strap at an associated slot, and a second position for allowing the strap to slide in the associated slot.

In accordance with another embodiment described herein, a shelving system for mounting to a fixed shelf that is in a substantially fixed position is provided. The shelving system includes a bracket that engages the fixed shelf, at least one strap extending from the bracket, and a shelf releasably attached to any applicable straps.

BRIEF DESCRIPTION OF THE DRAWINGS

For a more complete understanding of the dispenser described herein, reference should now be had to the embodiments shown in the accompanying drawings and described below. In the drawings:

FIG. 3 is a front elevation view of the shelving system shown in FIG. 1.

FIG. 4 is a right side elevation view of the shelving system shown in FIG. 1 with the attachment brackets shown in FIG. 2.

DETAILED DESCRIPTION

Certain terminology is used herein for convenience only and is not to be taken as a limitation on the embodiments described. For example, words such as "top", "bottom", "upper," "lower," "left," "right," "horizontal," "vertical," "upward," and "downward" merely describe the configuration shown in the figures. Indeed, the referenced components may be oriented in any direction and the terminology, therefore, should be understood as encompassing such variations unless specified otherwise.

Figure 1:
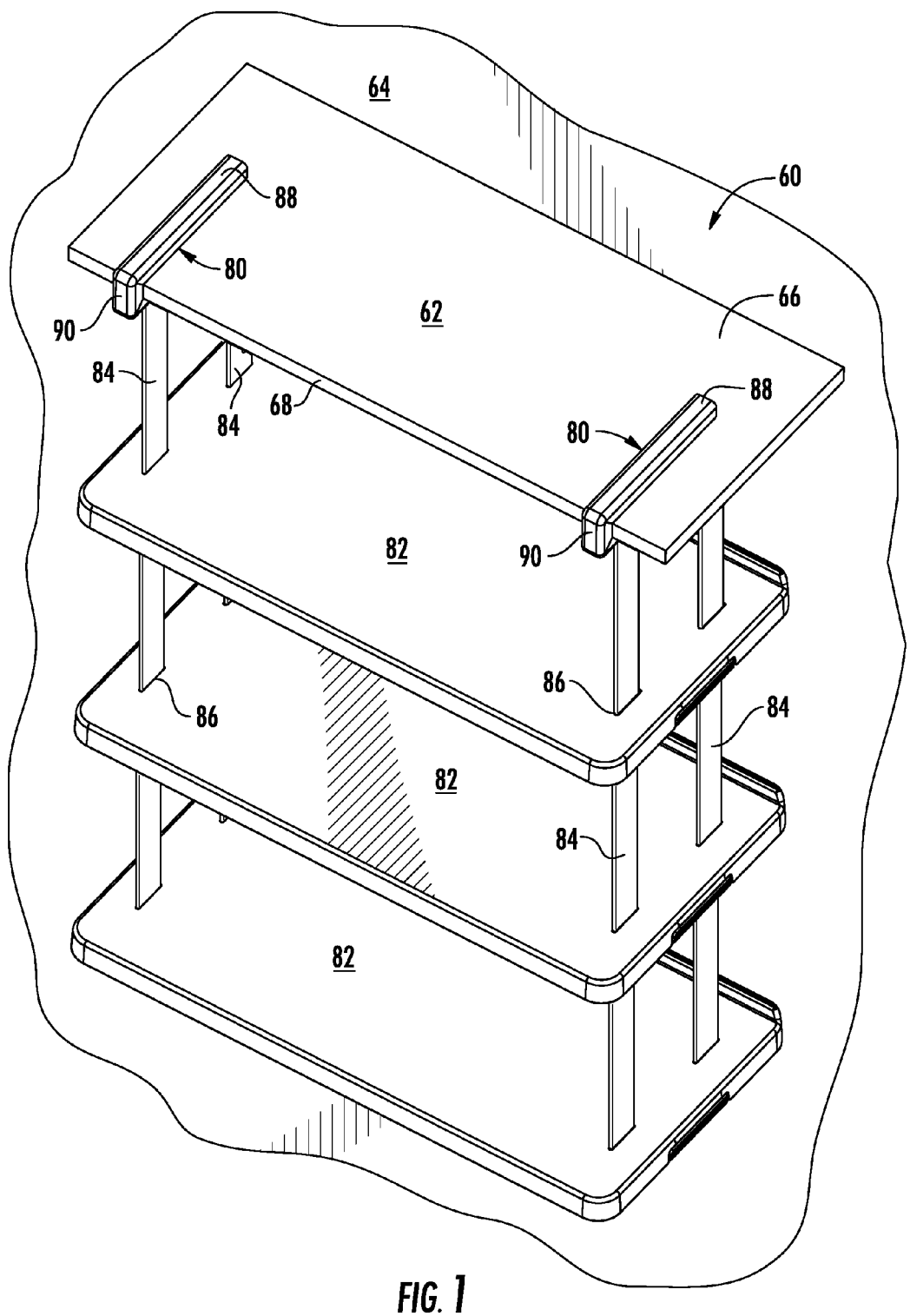
FIG. 1 is a perspective view from above of an embodiment of a shelving system with attachment brackets and a solid surface support shelf mounted to a wall.

Referring now to the drawings, wherein like reference numerals designate corresponding or similar elements throughout the several views, an embodiment of a shelving system is shown in FIG. 1, and is generally designated as 60. The system 60 is shown with a solid surface support shelf 62 mounted to a wall 64, though other mounting configurations, such as to posts or poles, are possible. The solid surface support shelf 62 may be, for example, wood, laminate, or plastic, but generally may be any material with substantially flat top and bottom surfaces as selected by one of ordinary skill in the art. The system 60 may further include means of mounting the shelf 62 to the wall 64 that is not shown, such as mounting strips fastened to the wall 64, with support brackets (not shown) mounted to the mounting strips at one end of the support bracket and supporting the free edge of the shelf 62 with the other end of the support bracket. The support brackets can be placed at various positions in the mounting strips to vary the height of the shelf 62. The shelf 62 includes a deck 66 and a front edge 68.

Figure 2:
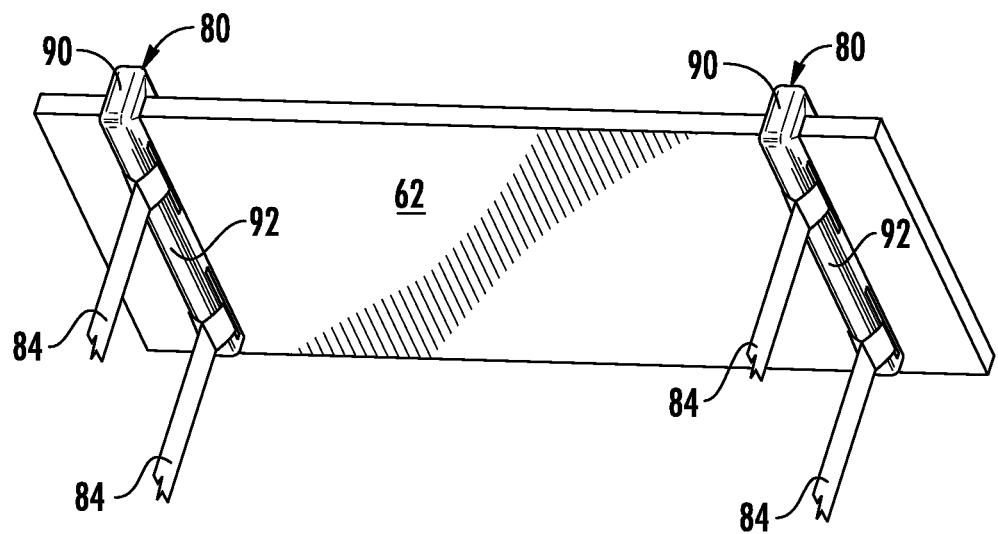
FIG. 2 is a perspective view from below of the support shelf and a first embodiment of the attachment brackets shown in FIG. 1.
Figure 5:
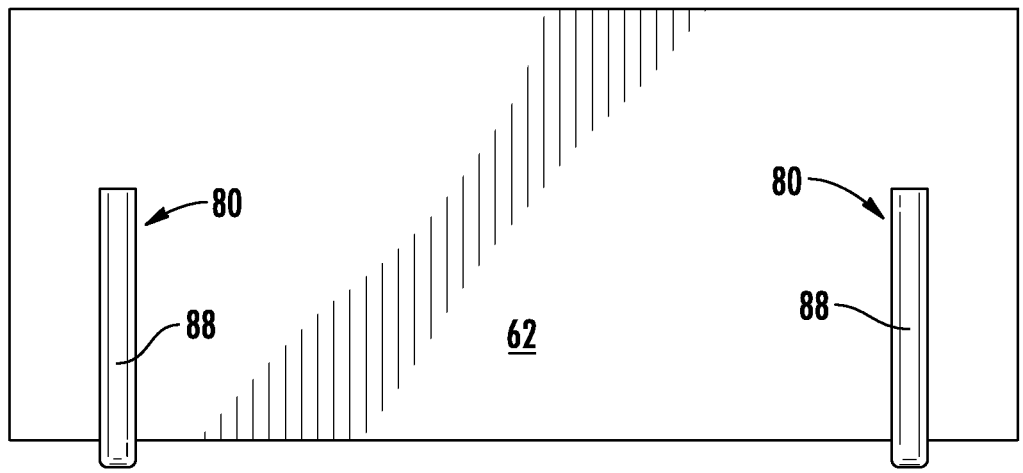
FIG. 5 is a top plan view of the shelving system shown in FIG. 1.
Figure 6:
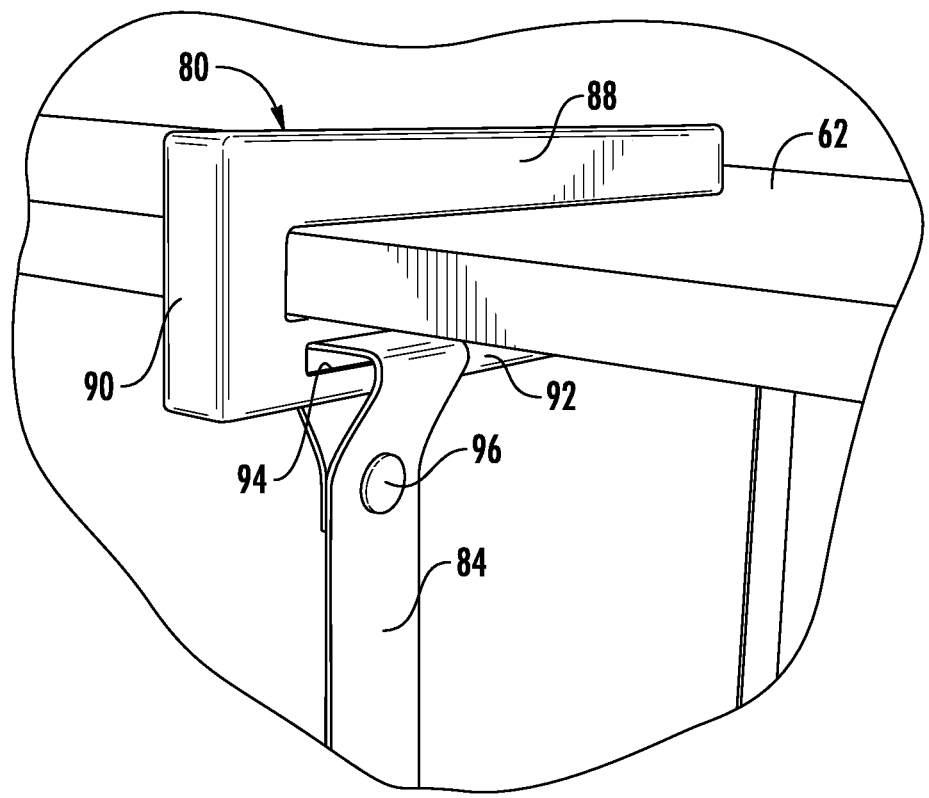
FIG. 6 is a detailed perspective view of the support shelf and the attachment bracket shown in FIG. 2.

Two solid shelf attachment brackets 80 are mounted to the support shelf 62, and hanging shelves 82 are suspended from the attachment brackets 80 with straps 84 passing through slots 86. The attachment brackets 80 are substantially U-shaped, having a top leg 88, a front portion 90, and a bottom leg (not shown in FIG. 1). FIG. 2 shows the bottom leg 92 of the attachment bracket 80 in position on the shelf 62. FIGS. 3, 4, and 5 show front elevation view, side view, and top plan view of the system 60, respectively. A front strap 84 passing through a slot 94 in the attachment bracket 80 is shown in FIG. 6. The strap 84 forms a loop through the slot 94 and may be fastened to itself with a snap 96, rivet, or other fastening means.

Figure 7:
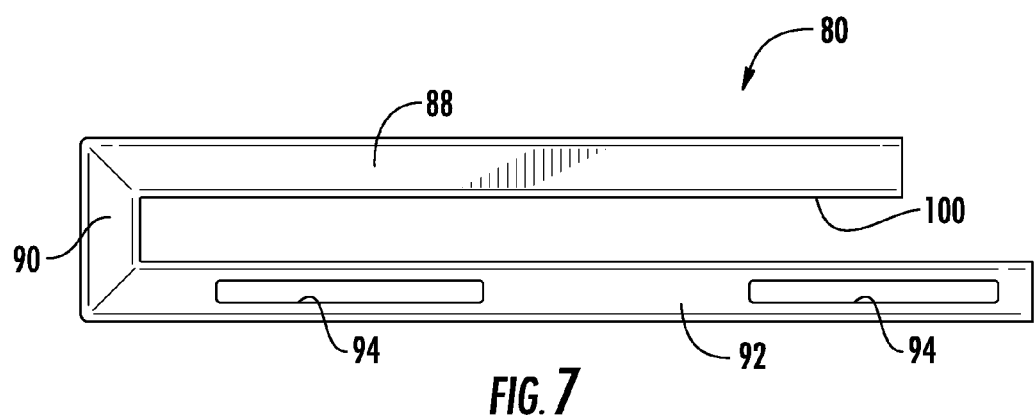
FIG. 7 is a right side elevation view of the attachment bracket shown in FIG. 2.
Figure 8:
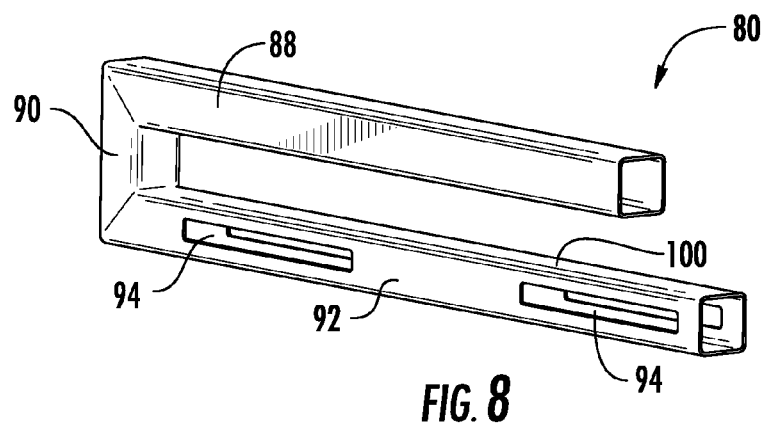
FIG. 8 is a left perspective view from the back of the attachment bracket shown in FIG. 2.

The attachment bracket 80 is further detailed in FIGS. 7 and 8. The top leg 88 of the attachment bracket 80 is substantially parallel to and opposes the bottom leg 92 to form an opening 100, and the front portion 92 connects the two legs 88, 92. This configuration permits sliding of the attachment bracket 80 around the shelf 62 for mounting of the attachment bracket 80 on the shelf 62, with the top leg 88 resting on the shelf deck 66, the front portion 90 in contact with or proximate to the front edge 68 of the shelf 62, and the bottom leg 92 in contact with or proximate to the bottom of the deck 66. In this embodiment, there are two slots 94 through the bottom leg 92. The slots 94 may be at substantially the same position with respect to the height of the bottom leg 92, in this case centered on the height of the bottom leg 92, or could be positioned at different heights than shown. The slots 94 may be spaced from front to back of the bottom leg 92, which spaces the straps 84 to provide, with two attachment brackets 80 with two slots 94, four points of support for each hanging shelf 82. The top leg 88 and bottom leg 92 may be different lengths; in the embodiment shown the bottom leg 92 is longer than the top leg 88.

The attachment bracket 80 may be made of a variety of materials; in the embodiment shown, the attachment bracket 80 is made of metal tubing that is substantially square in cross-section, cut in two places, and folded and welded at the corners or otherwise secured in the desired shape. In one embodiment, the metal tubing is approximately 0.75 inches on each side in cross section, and the wall thickness is approximately 0.4 inches, or at least approximately 0.039 inches. The attachment bracket 80 may also be other closed cross-sectional shapes, and although the embodiment shown has open ends, the ends could be closed with, for example, plastic plugs or metal. The slots 94 may be punched as known to one of ordinary skill in the art. Possible materials for the attachment bracket 80 include plastic, wood, or composite in addition to metal.

Figure 9:
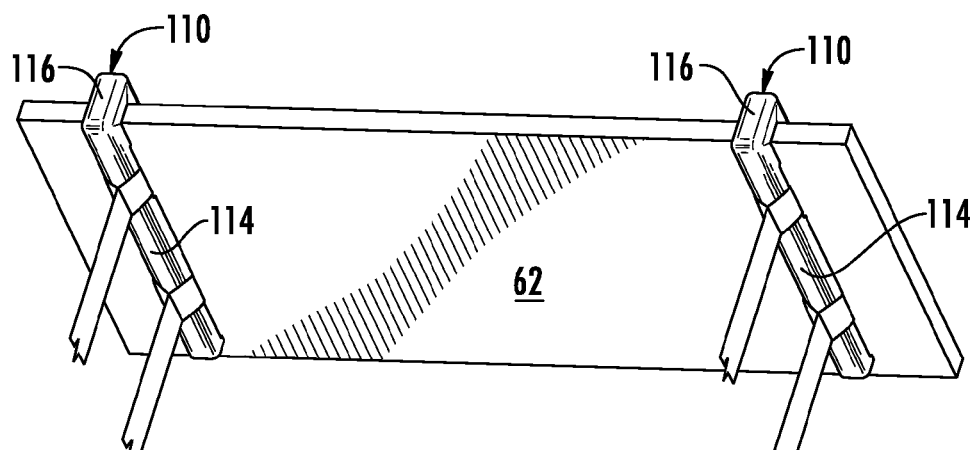
FIG. 9 is a perspective view from below of the support shelf and a second embodiment of the attachment brackets shown in FIG. 1.
Figure 10:
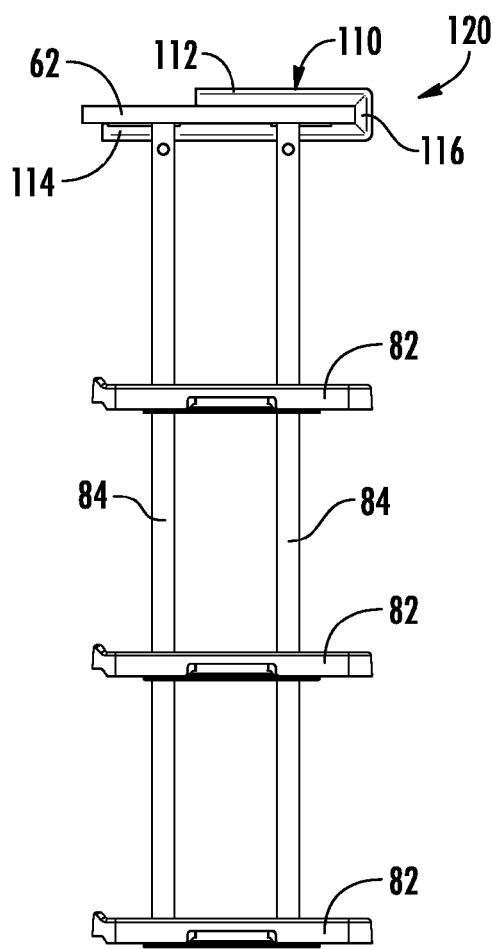
FIG. 10 is a right side elevation view of the shelving system shown in FIG. 1 with the attachment brackets shown in FIG. 9.
Figure 11:
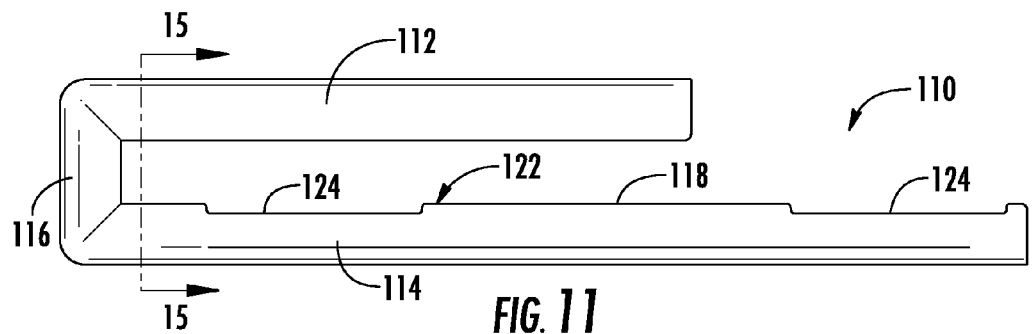
FIG. 11 is a right side elevation view of the attachment bracket shown in FIG. 9.
Figure 12:
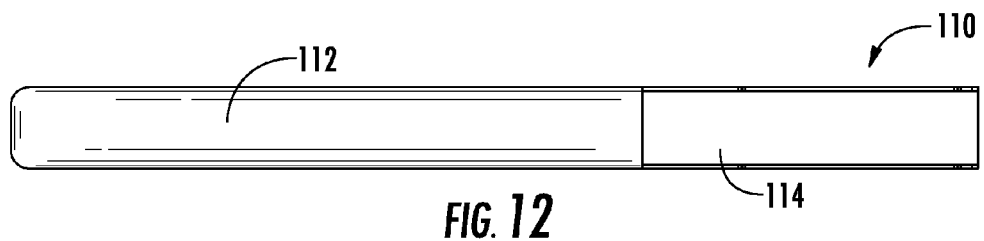
FIG. 12 is a top plan view of the attachment bracket shown in FIG. 11.
Figure 13:
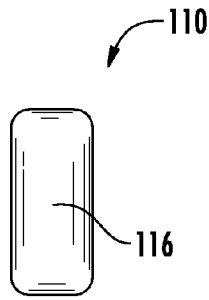
FIG. 13 is a rear elevation view of the attachment bracket shown in FIG. 11.
Figure 14:
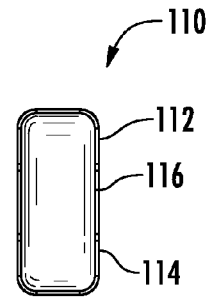
FIG. 14 is a front elevation view of the attachment bracket shown in FIG. 11.
Figure 15:
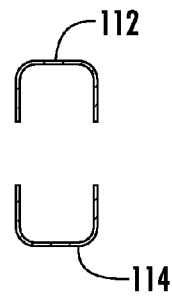
FIG. 15 is a section view taken along line 15-15 of FIG. 11.
Figure 16:
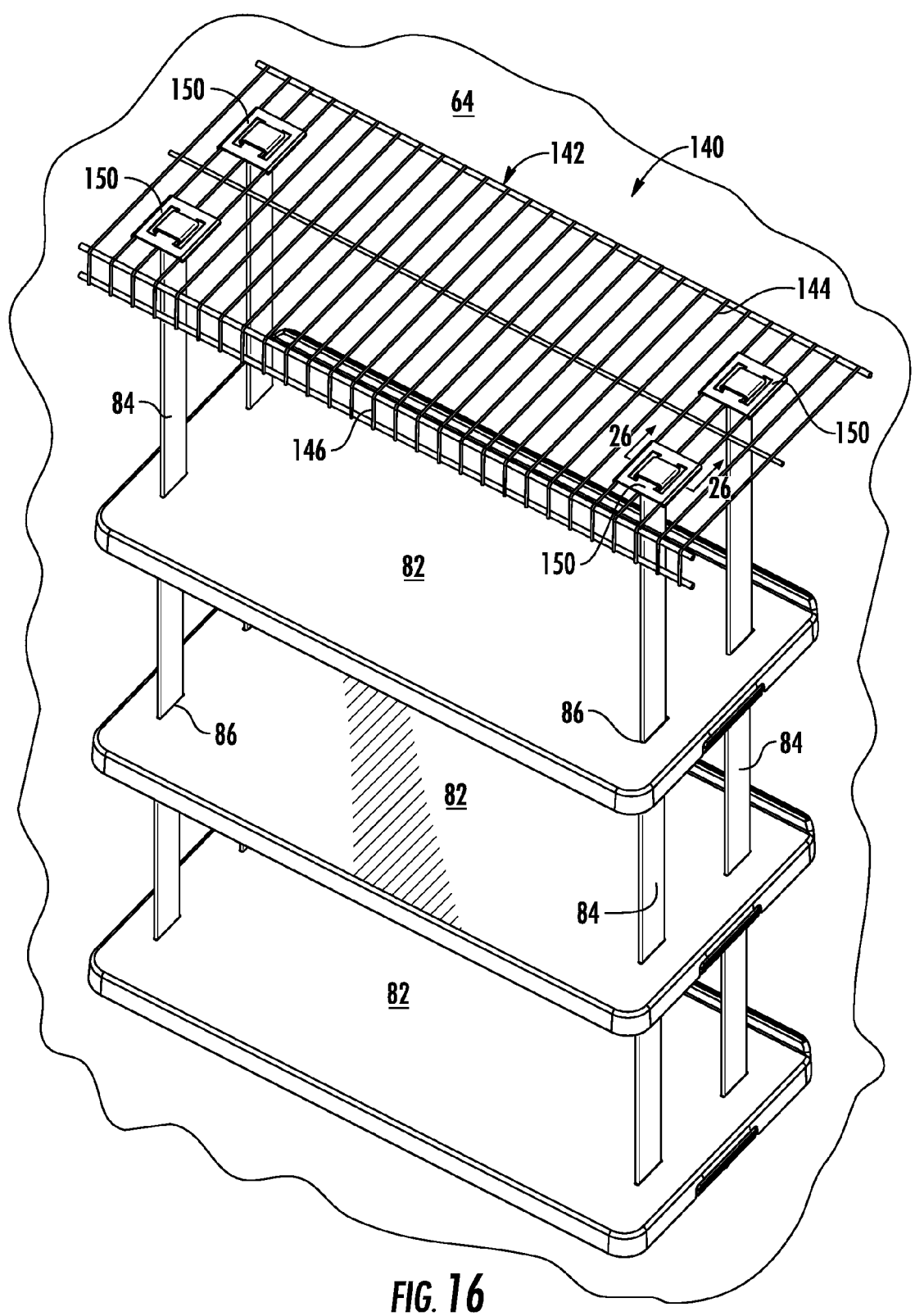
FIG. 16 is a perspective view from above of an embodiment of a shelving system with attachment brackets on a wire support shelf mounted to a wall.
Figure 17:
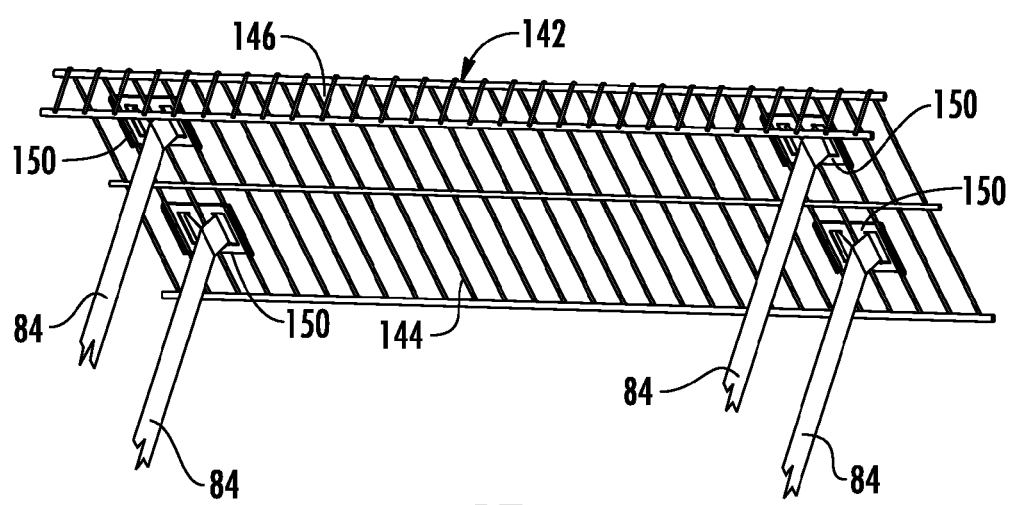
FIG. 17 is a perspective view from below of the support shelf and an embodiment of the attachment brackets shown in FIG. 1.
Figure 19:
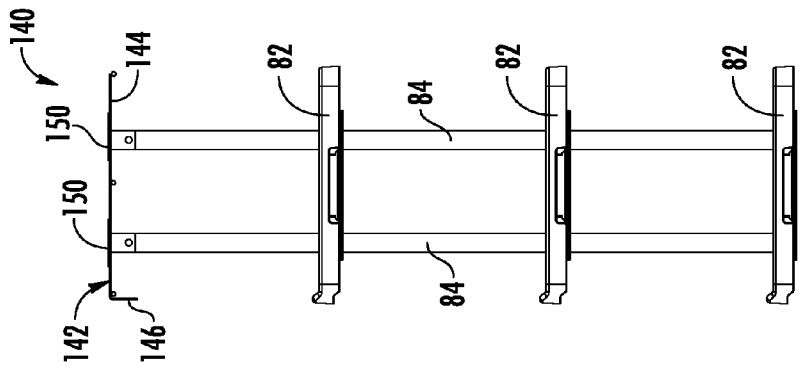
FIG. 19 is a left side view elevation of the shelving system shown in FIG. 16.
Figure 18:
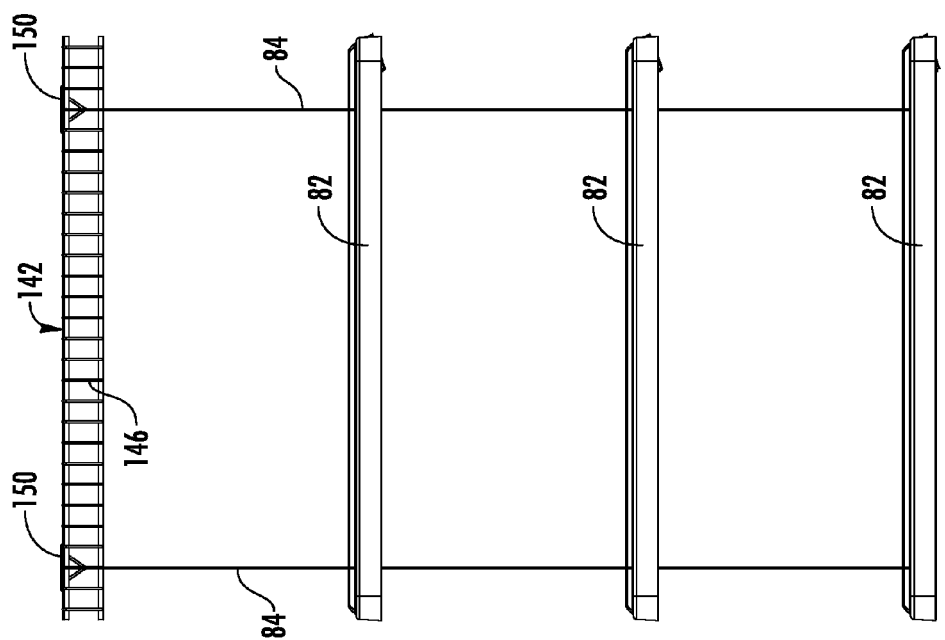
FIG. 18 is a front elevation view of the shelving system shown in FIG. 16.
Figure 20:
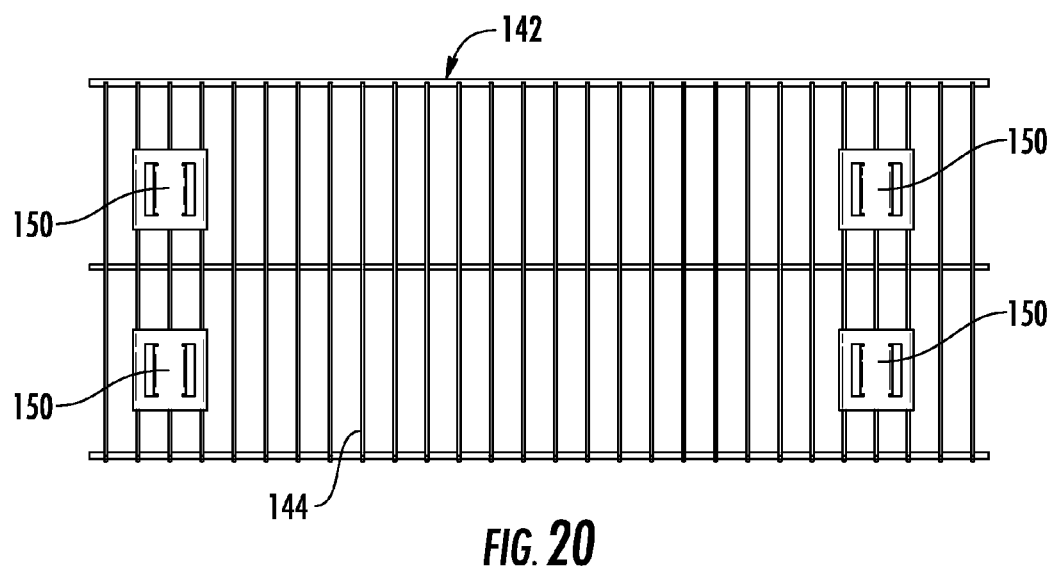
FIG. 20 is a top plan view of the shelving system shown in FIG. 16, with the straps omitted.
Figure 21:
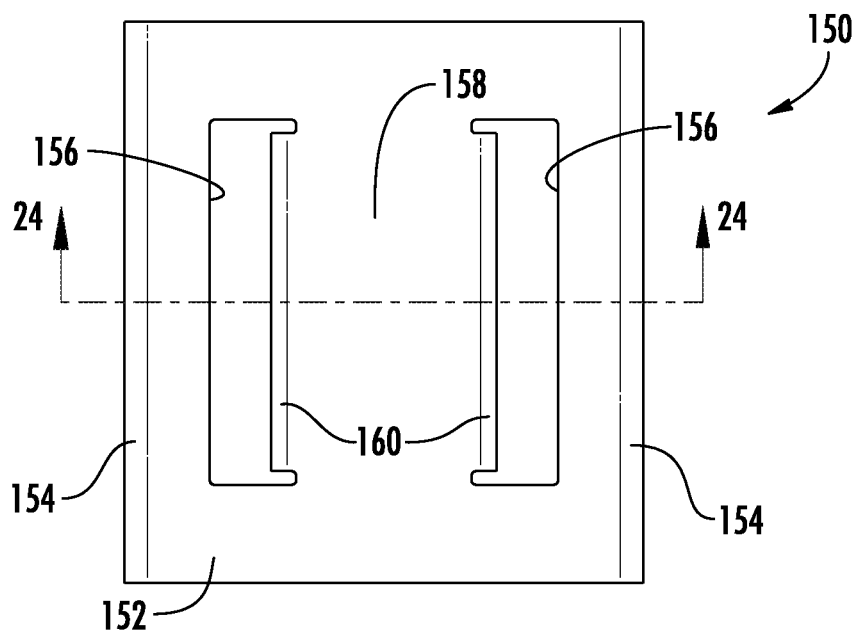
FIG. 21 is a detailed perspective view of the support shelf and the attachment bracket shown in FIG. 16.
Figure 22:
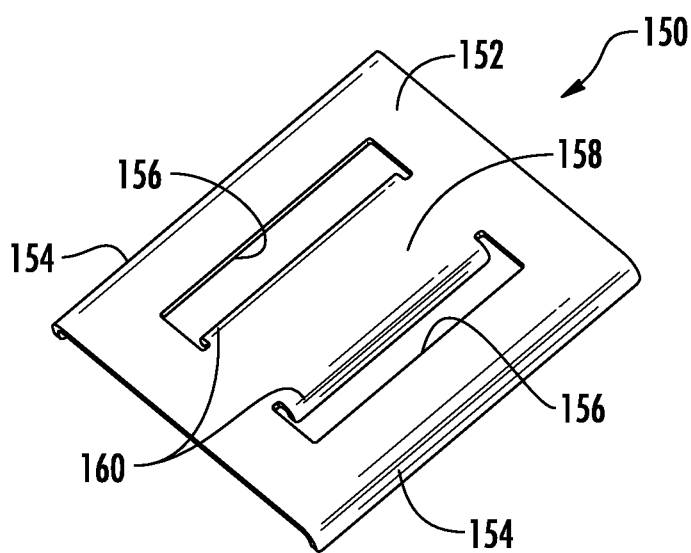
FIG. 22 is a top plan view of the bracket as shown in FIG. 16.
Figure 23:
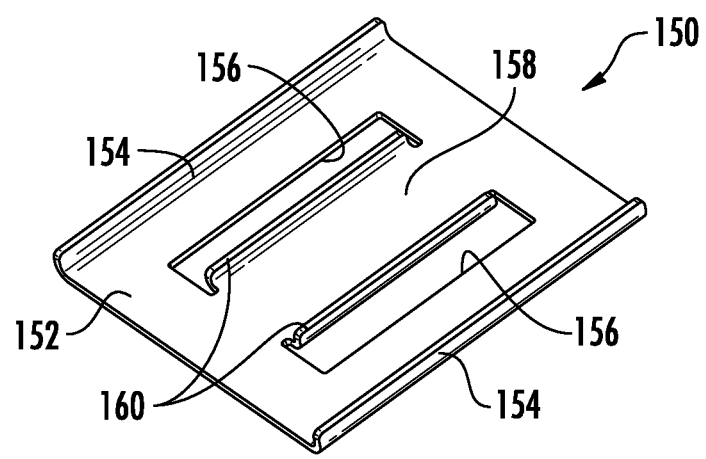
FIG. 23 is a top perspective view of the bracket as shown in FIG. 22.
Figure 24:
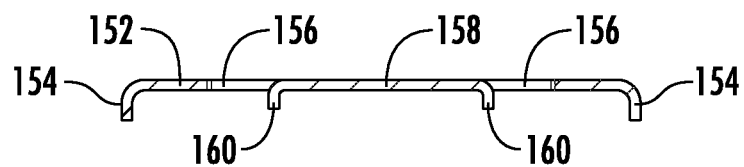
FIG. 24 is a bottom perspective view of the bracket as shown in FIG. 22.

FIGS. 9-15 show a second embodiment of an attachment bracket 110 for mounting to a solid shelf 62. This attachment bracket 110 appears the same as the previous embodiment of an attachment bracket 80 as shown in FIGS. 1, 3, and 5. This attachment bracket 110 likewise is configured to be substantially U-shaped, having a top leg 112, a bottom leg 114, and a front portion 116 connecting the legs 112, 114, all defining an opening 118. FIG. 9 shows the bottom leg 114 of the attachment bracket 110 in position on the shelf 62, and FIG. 10 shows a side elevation view of the system 120, with the straps 84 looping around the bottom leg 114 of the attachment bracket 110. The straps 84 engage the top surface 122 of the bottom leg 114 at recessed areas 124 along the top surface 122 (FIG. 11). In this embodiment of the attachment bracket 110, the strap 84 may be pre-fastened to make a loop in the strap 84 before reaching a user because the recessed areas 124 can be accessed from the free end of the bottom leg 114, as opposed to requiring threading of the strap 84 through slots 94 as in the first embodiment of an attachment bracket 80.

FIGS. 11-15 show the second embodiment of the attachment bracket 110 in detail, which in general has the same configuration and method of mounting to the support shelf 62 as the first embodiment 80. In the second embodiment, however, the top leg 112, front portion 116, and bottom leg 114 are each open channels. The recessed areas 124 may be spaced from front to back of the bottom leg, which again spaces the straps 84 to provide, with two attachment brackets 110 with two recessed areas 124, four points of support for each hanging shelf 82. The attachment bracket 110 may be made of a variety of materials; in the embodiment shown, the attachment bracket 110 may be made of metal and may be formed from a flat, stamped plate and welded or otherwise secured in the desired shape. Materials for this embodiment also may include plastic, or as selected by one of ordinary skill in art.

Another embodiment of a shelving system is shown in FIGS. 16-20, and is generally designated as 140. The system 140 is shown with a wire support shelf 142 mounted to a wall 64, though other mounting configurations, such as to posts or poles, are possible. The system 140 may further includes means of mounting the wire support shelf 140 to the wall 64 that is not shown, such as clips, with support brackets (not shown) mounted to the wall at one end of the support bracket and supporting the free edge of the shelf 142 with the other end of the support bracket. The shelf 142 includes a deck 144 and a front edge 146.

Four wire shelf attachment brackets 150 are positioned on the deck 144 in a substantially rectangular configuration, and hanging shelves 82 are suspended from the attachment brackets 150 with straps 84. The four attachment brackets 150 provide four points of support for the hanging shelves 82 for stability and strength. An attachment bracket 150 is shown in detail in FIGS. 21-24. This embodiment of an attachment bracket 150 shown is substantially a plate with a body 152 having downturned curved edges 154 along two sides and two elongated substantially parallel openings or slots 156 that are substantially parallel to the curved edges 154. The slots 156 are on either side of a center portion 158 of the body 152 and each has on their its side proximate to the center of the body 152 downwardly curved lips 160.

Figure 25:
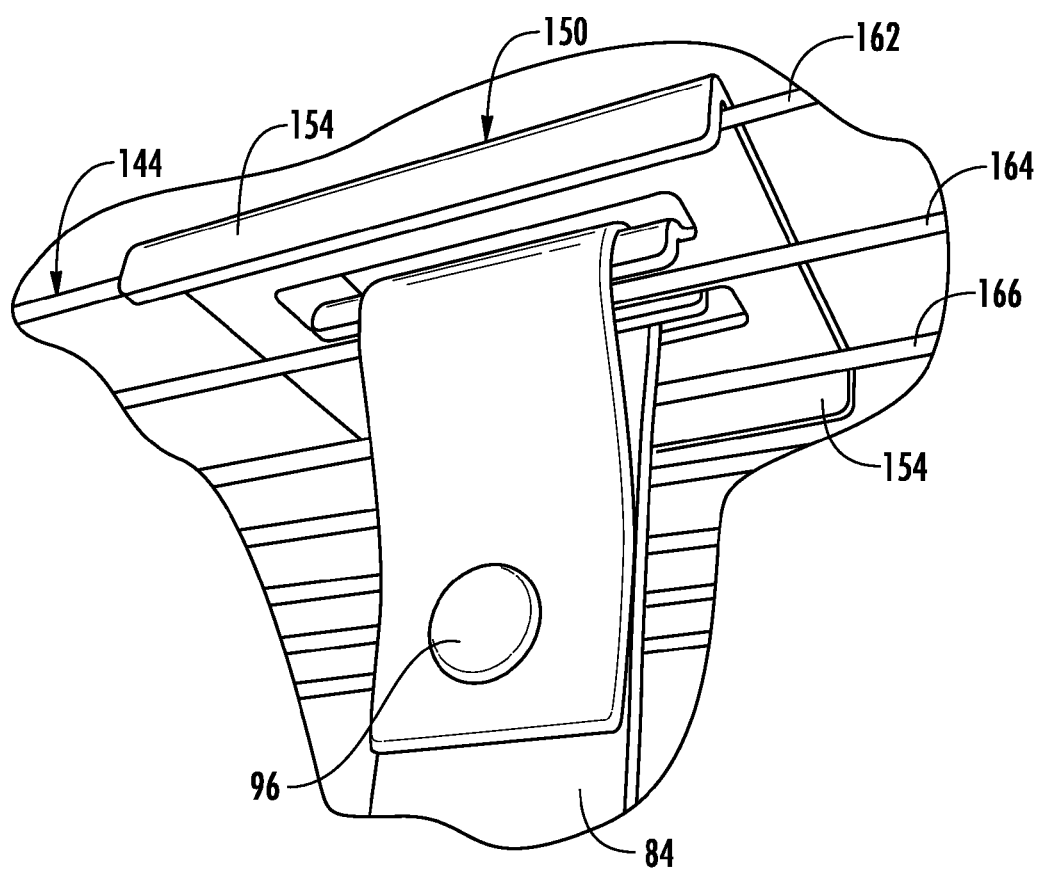
FIG. 25 is a section view of the bracket taken along line 25-25 of FIG. 22.
Figure 26:
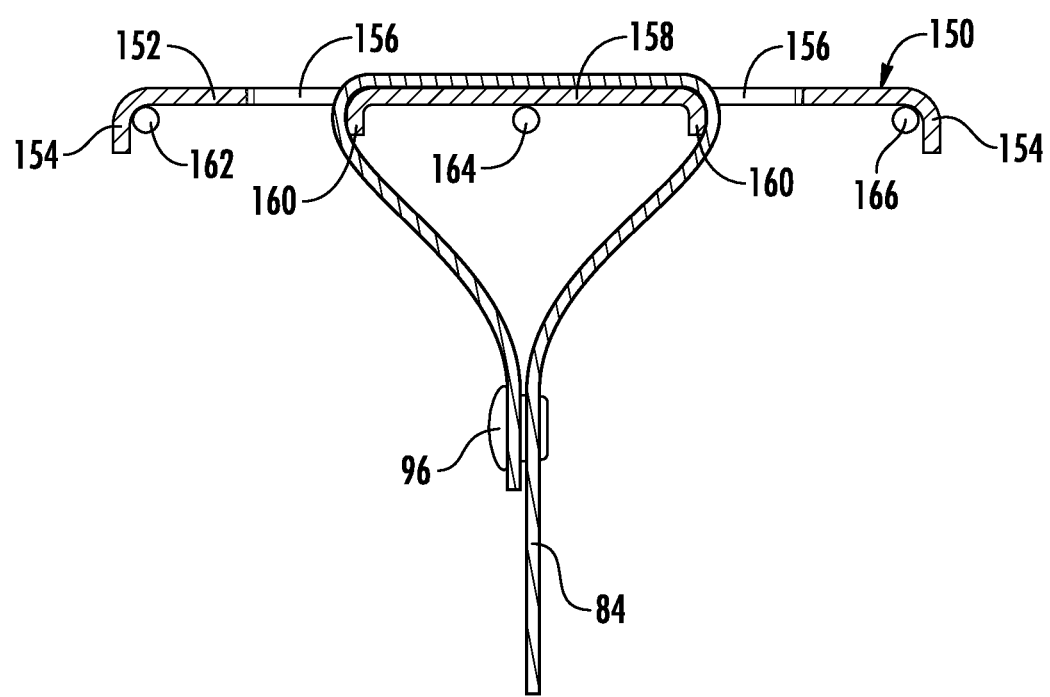
FIG. 26 is a section view taken along line 26-26 of FIG. 16.
Figure 27:
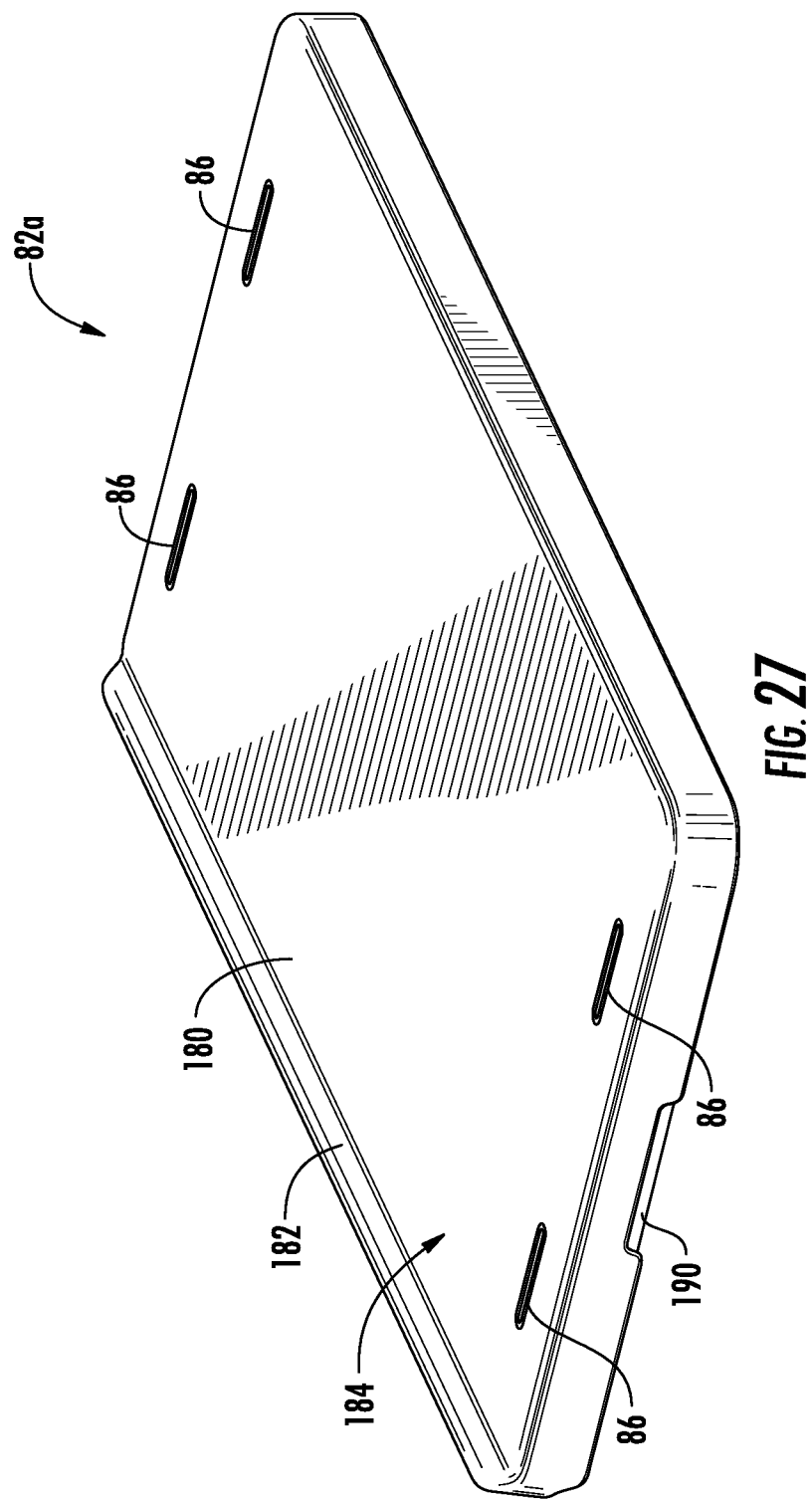
FIG. 27 is a top perspective view of a first embodiment of a shelf shown in the shelving systems of FIGS. 1 and 16.

The straps 84 weave through openings in the attachment brackets 150 as shown in detail in FIGS. 25 and 26. The embodiment of the attachment bracket 150 shown spans three wires 162, 164, 166 of the wire shelf deck 144, where preferably the attachment bracket 150 is centered on the center wire 164. The distance between the curved edges 154 may be set such that the curved edges 154 engage the outside wires 162, 166 and prevent lateral movement of the attachment bracket 150. The attachment bracket 150 could have an offset structure such that the strap 84 is not aligned with the center wire 164. Spanning a plurality of wires increases the stability and strength of the deck support of the straps 84. The separate attachment bracket design permits adjustment from front to back of a support shelf 62, for example, to reduce the distance between the back of a hanging shelf 82 and the wall 64, or to accommodate wider shelves with wider spacing between slots 86.

The lips 160 are shaped to engage the straps 84 with their curved surface, and are threaded through the wire shelf deck 144 and the openings 156 in the attachment bracket 150. Although the center portion 158 of the attachment bracket 150 is shown spanning one wire 164, the center portion could span a plurality of wires. Because the strap 84 has to be threaded through the attachment brackets 150 and wires 162, 164, 166, in this embodiment a user needs to be able to fasten the strap 84 to itself, for example, with a snap 96 or other fastener when assembling the system. Preferably the fastener is releasable to allow relocation or adjustment of the position of the attachment brackets 150 and system 140.

The material of the attachment brackets 80, 110, 150 may generally be expected to be metal, such as a low carbon steel or other steel alloy, or alternatively may be a plastic, and may be high strength polymer and/or include carbon reinforcing, but may be other metals or materials as selected by one of ordinary skill in the art. Methods of manufacture may include, but not be limited to, injection molding, die casting, sand casting, or extrusion. If metal, a surface treatment may be applied for corrosion protection, for example, a zinc coating by a barrel plating process, galvanizing, or a powder based epoxy or paint coating, or as otherwise selected by one of ordinary skill in the art.

Figure 28:
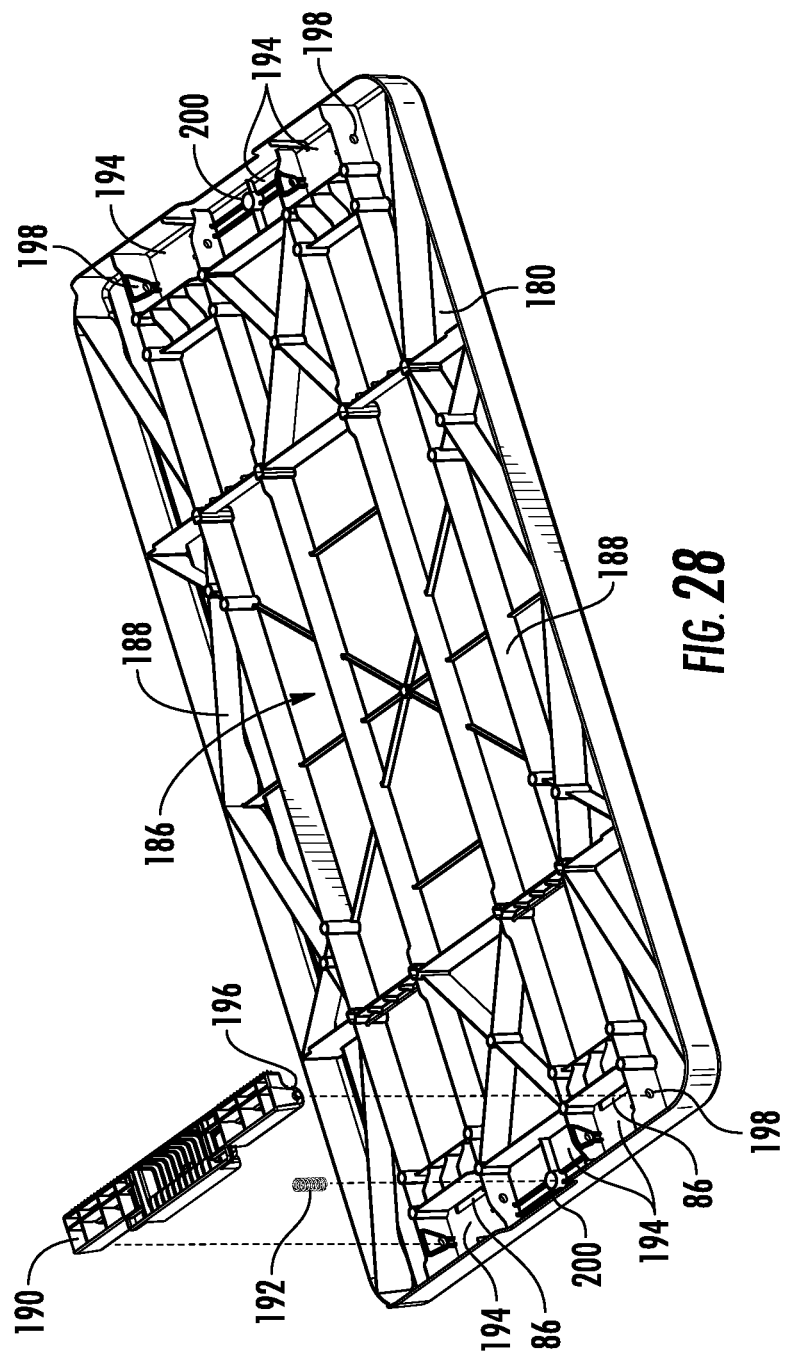
FIG. 28 is an exploded bottom perspective view of the shelf shown in FIG. 27, including a first embodiment of a clamp.
Figure 29:
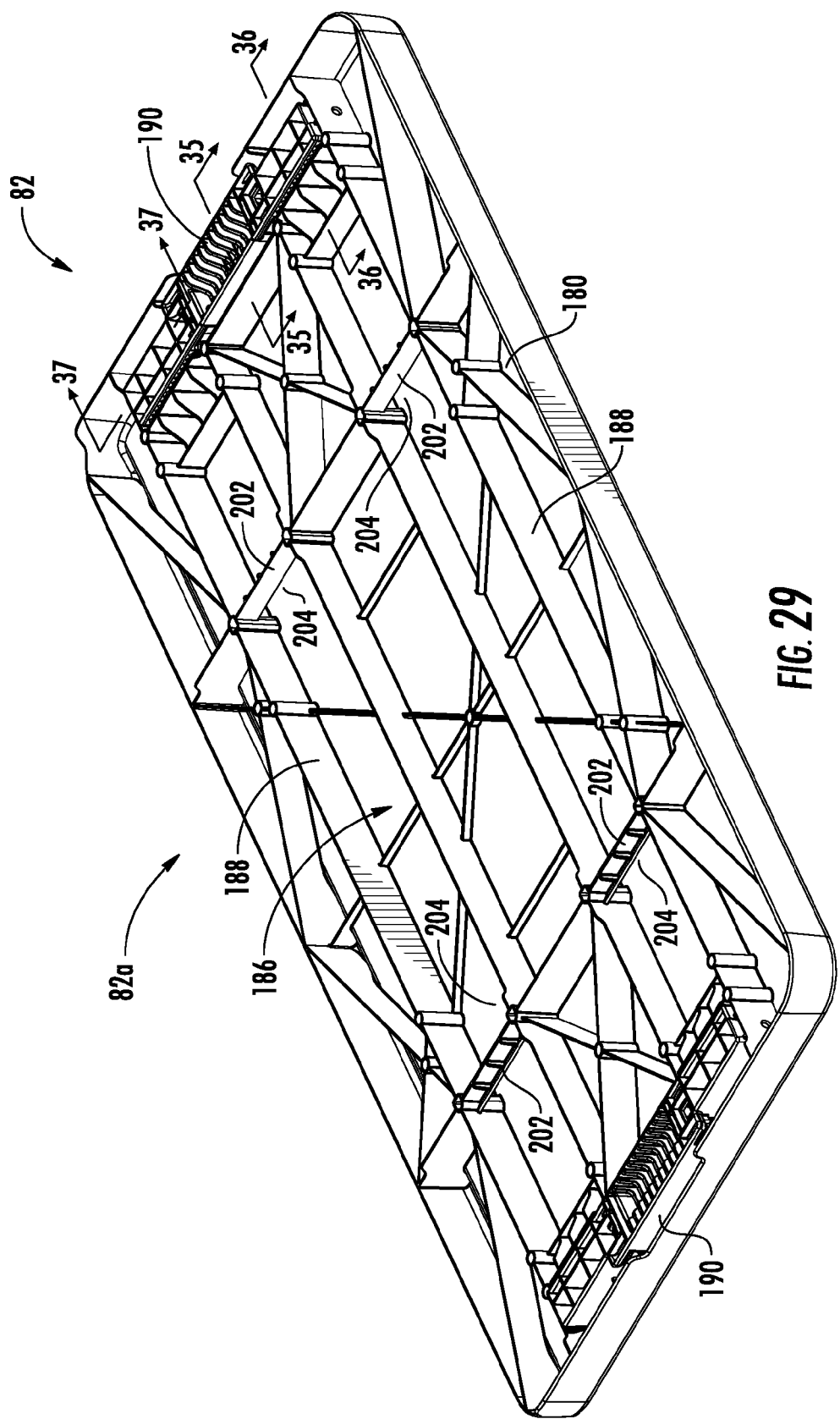
FIG. 29 is a bottom perspective view of the shelf shown in FIG. 27.

FIGS. 27-37 show a first embodiment and components of a hanging shelf 82a that may be used as the shelf 82 in the shelving systems 60, 120, 140 described above, or in other shelving systems that employ straps to hang the shelves. The hanging shelf 82a has a deck 180 that is substantially rectangular in plan view, but may be other shapes, and has an optional lip 182 at the rear edge to help keep articles on the top surface 184. Four or another plurality of slots 86 may be provided for receiving straps 84 from which the shelf 82 is suspended. FIG. 28 shows the bottom surface 186 of the deck 180 with stiffener ribs 188, a clamp 190, and a spring 192 for biasing the clamp 190 to the closed, engaged position. The clamp 190 is received in openings 194 in the deck 180, and has round pivot protrusions or pivot bosses 196 that are received in openings 198 in the ribs 188. The spring 192 is received in a cylindrical opening 200 in the deck. Another clamp 190 will be placed at the opposite end of the deck 180, as shown in FIG. 29. The straps 84 pass through the slots 86 to allow hanging of one shelf 82a beneath another shelf 82a, as shown in, for example, FIGS. 1 and 16.

As shown in FIG. 29, several ribs 202 extend across the deck 180 between other ribs 188, but are not in contact with the bottom surface 186 of the deck 180. As such, these ribs 202, which may be formed by a slide in an injection mold, provide a location for storage of the straps 84 in transit or excess strap length in usage, which may be folded and tucked in these areas 204 between the ribs 202 and the bottom surface 186 of the deck 180.

Figure 30:
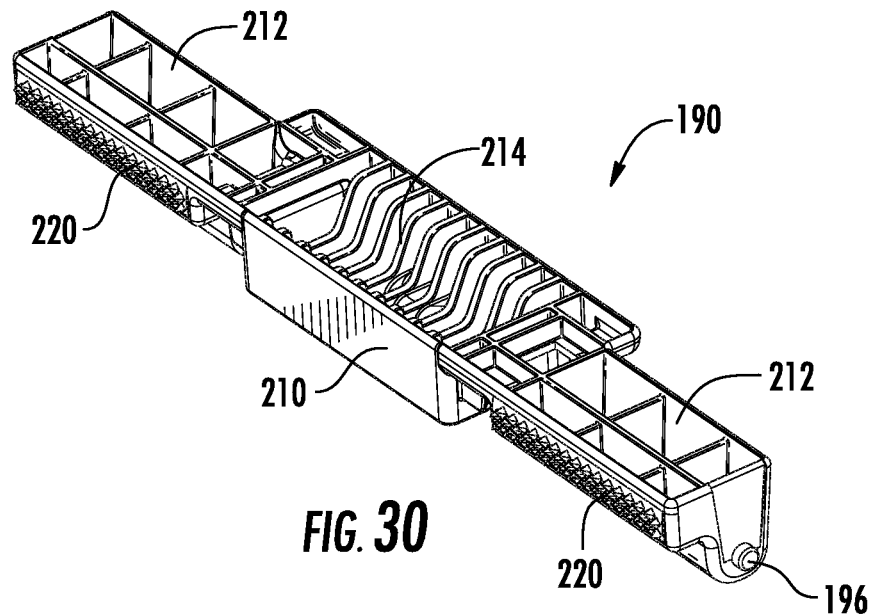
FIG. 30 is a bottom perspective view of the clamp shown in FIG. 28.
Figure 31:
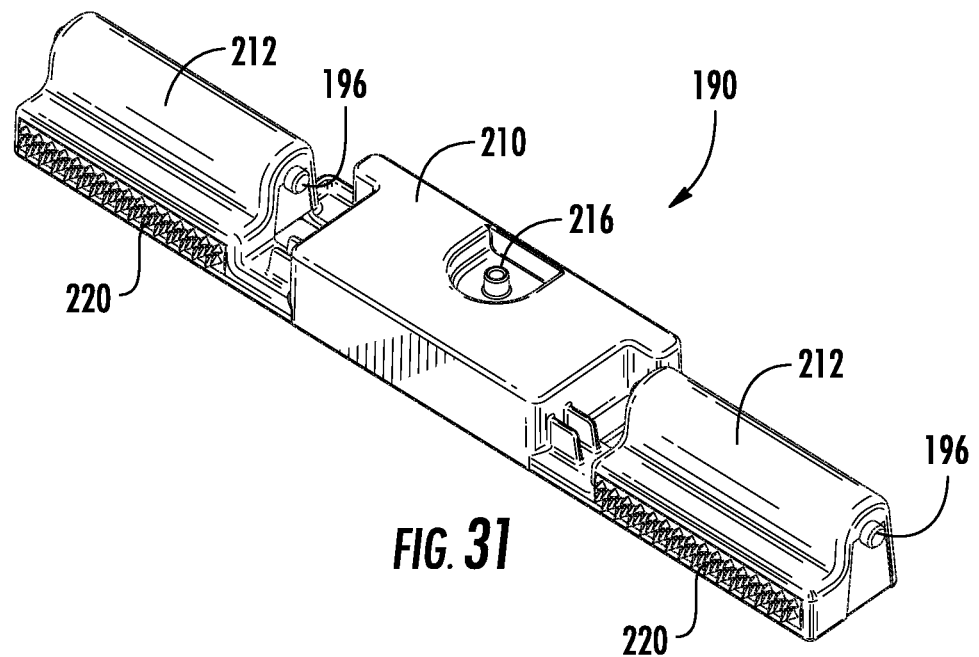
FIG. 31 is a top perspective view of the clamp shown in FIG. 28.
Figure 32:
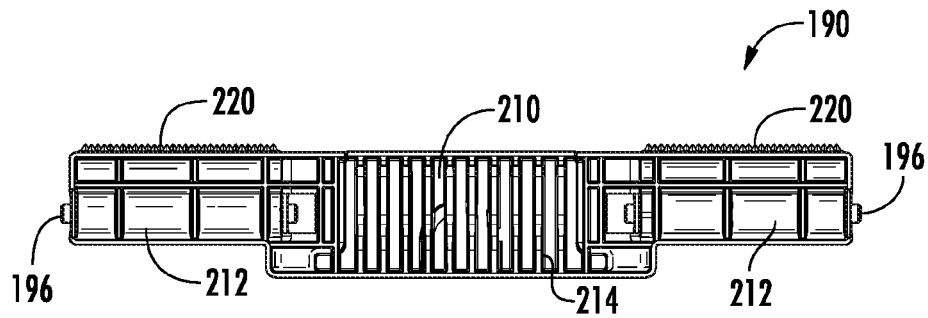
FIG. 32 is a bottom plan view of the clamp shown in FIG. 28.
Figure 33:
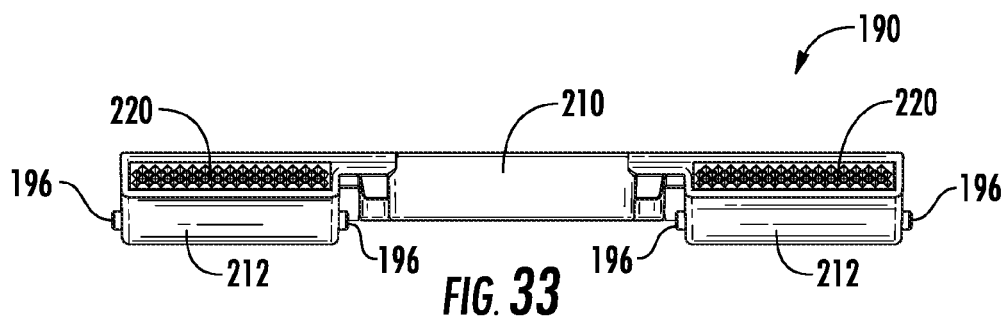
FIG. 33 is a front elevation view of the clamp shown in FIG. 28.
Figure 34:
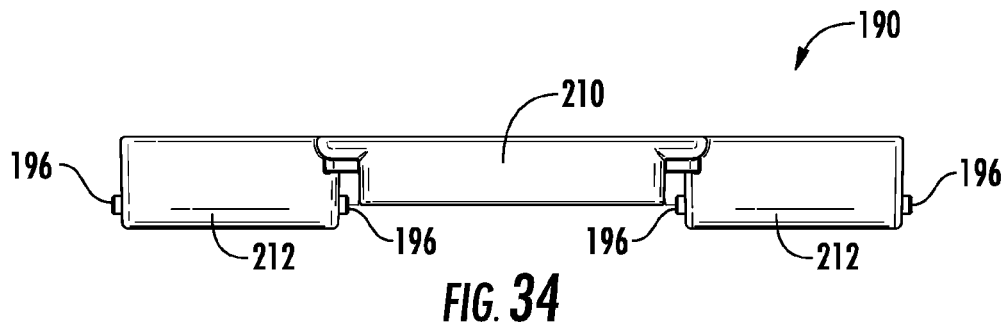
FIG. 34 is a rear elevation view of the clamp shown in FIG. 28.

FIGS. 30-34 show this first embodiment of a clamp 190 in detail. The view of FIG. 30 shows the bottom and front of the clamp 190, while FIG. 31 shows the top and front of the clamp 190. The bottom of the clamp 190 is the side that will be facing downward when received in the deck 180. The clamp 190 includes a handle portion 210 and two gripping portions 212. The pivot bosses 196 are provided on each side of the gripping portions 212 and secure the clamp 190 into the deck 180. The handle portion 210 includes a sloped section with an angled interaction surface 214 as an ergonomic design for hand placement. A round spring protrusion 216 is provided for receiving the spring 192 towards the back of the handle portion 210. The gripping portions 212 each include a toothed section 220 that will engage a strap 84 that passes through the adjacent slot 86. By placing the interaction surface 214 of the clamp 190 at least under the clamp's pivot point (the pivot bosses 196) or inside the pivot point toward the center of the shelf 82a, a user's application of force to the interaction surface 214 results in a torque being applied to open the mechanism and release the straps 84. If the interaction surface 214 were far away from the pivot point, such that the clamp 190 was biased away from the deck 180, a user would generate a torque opposite to the closing direction of the clamp 190. To allow the clamp 190 to close on the strap 84, the user would have to temporarily have to let go of the shelf 82*a*, causing the shelf 82*a* to fall slightly and result in an unsettling feeling for the user.

Figure 35:
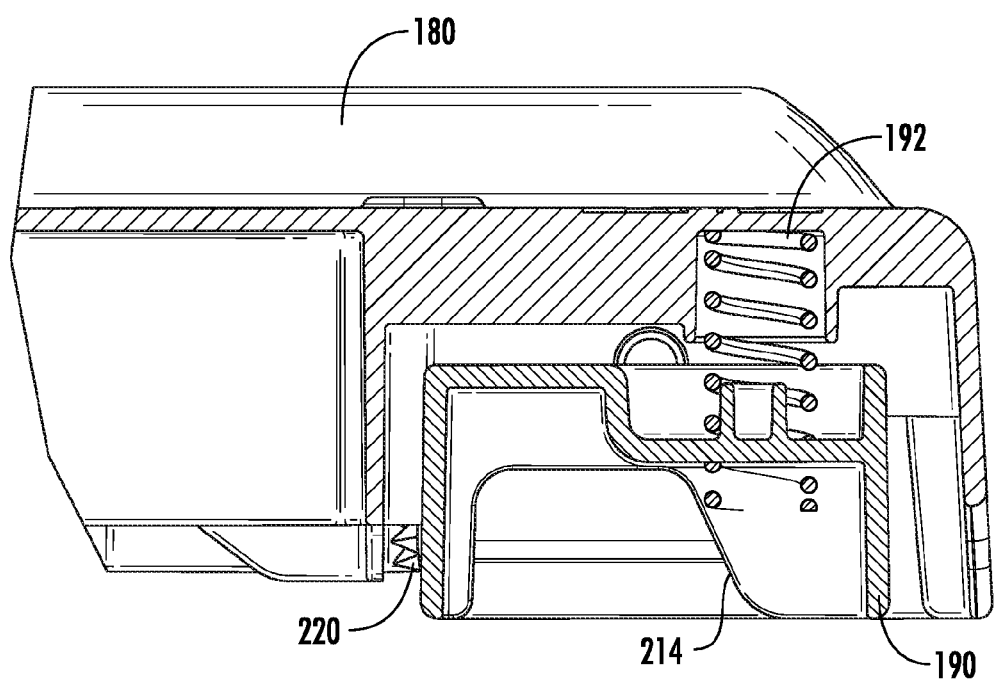
FIG. 35 is a section view taken along line 35-35 of FIG. 29.
Figure 36:
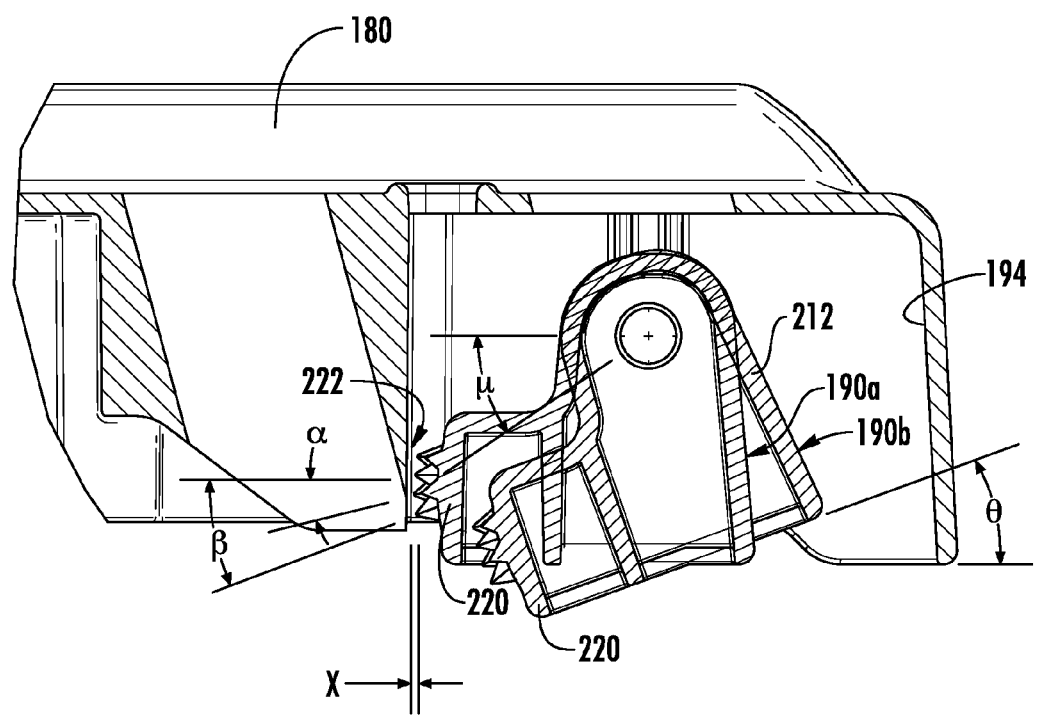
FIG. 36 is a section view taken along line 36-36 of FIG. 29.

FIG. 35 shows a section of the clamp through the handle portion 210 at the center where the spring 192 is located. As discussed above, the spring 192 is received in a cylindrical opening 200 in the deck 180, and around a round spring protrusion 216 of the handle portion 210 proximate to the back of the handle portion 210. The position of the spring 192 causes the clamp 190 to be biased to the engaged position, as shown in FIG. 35. FIG. 36 shows a section of the clamp 190 through the gripping portion 212, with the clamp 190 in both the closed, engaged position 190*a* and the open, disengaged position 190*b*. An engagement surface 222 is provided on the deck 180 that opposes the toothed section 220 when the clamp 190 is in the engaged position 190*a*. When in the engaged position 190*a*, the toothed section 220 engages the strap 84, and the downward force of the weight of the shelf 82*a* and the articles on the shelf 82 causes the toothed section 220 of the clamp 190 to rotate upward, tightening the mechanism and increasing the "bite" into the strap 84. The strap 84 is clamped, or pinned, between the engagement surface 222 and the toothed section 220 of the clamp 190.

In one embodiment, dimensions and angles may be as follows. The clearance X between the teeth 230 and the engagement surface 222 may be approximately at least 0.02 inches, or preferably 0.023 inches, and may be adjusted based on the thickness and material of the strap 84. The angle of rotation θ of the bottom of the gripping portion 212 from horizontal may be approximately 20 degrees. The angle μ which is the angle from the axis of rotation of the clamp 190 to the vertical center of the toothed portion 220 may be approximately 34 degrees, or preferably 34.1 degrees. The angles α and β of the main contact teeth, which may be considered to be the bottom two teeth, from horizontal may be respectively approximately 10 and 20 degrees.

Figure 37:
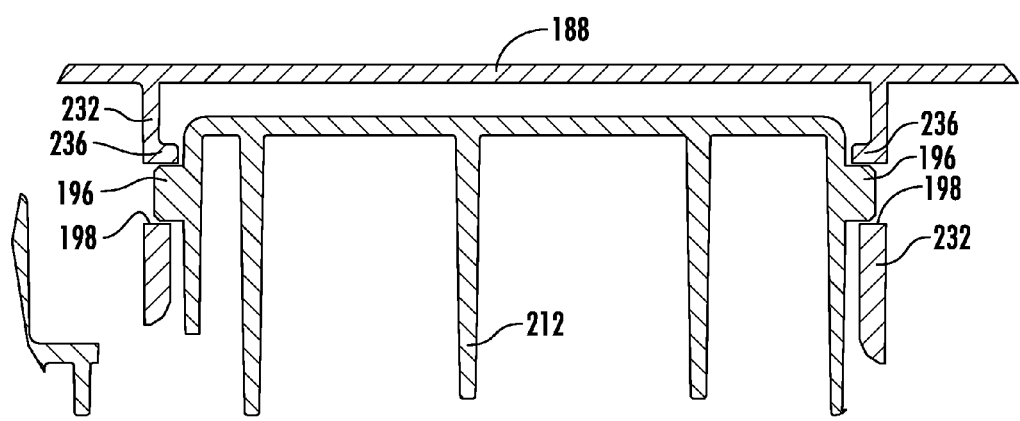
FIG. 37 is a section view taken along line 37-37 of FIG. 29.
Figure 38:
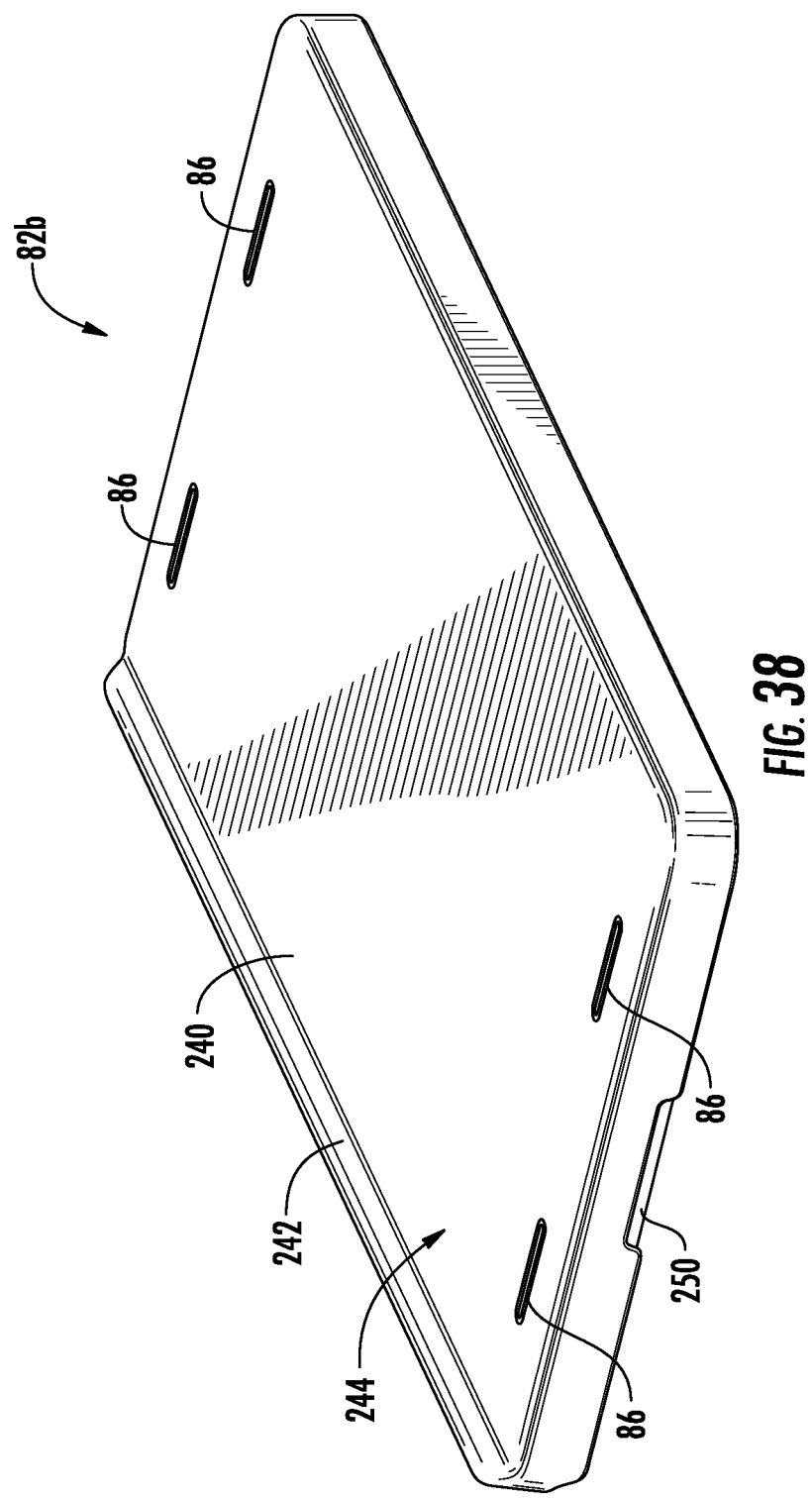
FIG. 38 is a top perspective view of a second embodiment of a shelf shown in the shelving systems of FIGS. 1 and 16.

FIG. 37 shows the mounting of the clamp 190, and specifically a gripping portion 212 in the deck 180. Ribs 232 on each side of the gripping portion 212 define openings 198 that receive the pivot bosses 196 of the gripping portion 212, where the pivot bosses 196 snap into place by slight deflection of the ribs 232. At their free edges, the ribs 232 are configured to have a progressive ramp design 234 to facilitate entry of the pivot bosses 196 between the ribs 232. A shelf feature 236 on each side is provided for extra engagement of the openings 198 with the clamp' pivot bosses 196. This three-dimensional geometry may be molded by using slides in an injection mold, which allows the ribs to be thickened locally. Rib thickening allows a longer ramp 234 to be used on the shelf rib 232 to guide the clamp 190 into place. Resulting from the thicker wall, the engagement can be increased between the ribs 232 of the shelf and the pivot bosses 196, which prevents issues that can result from tight tolerance.

Figure 39:
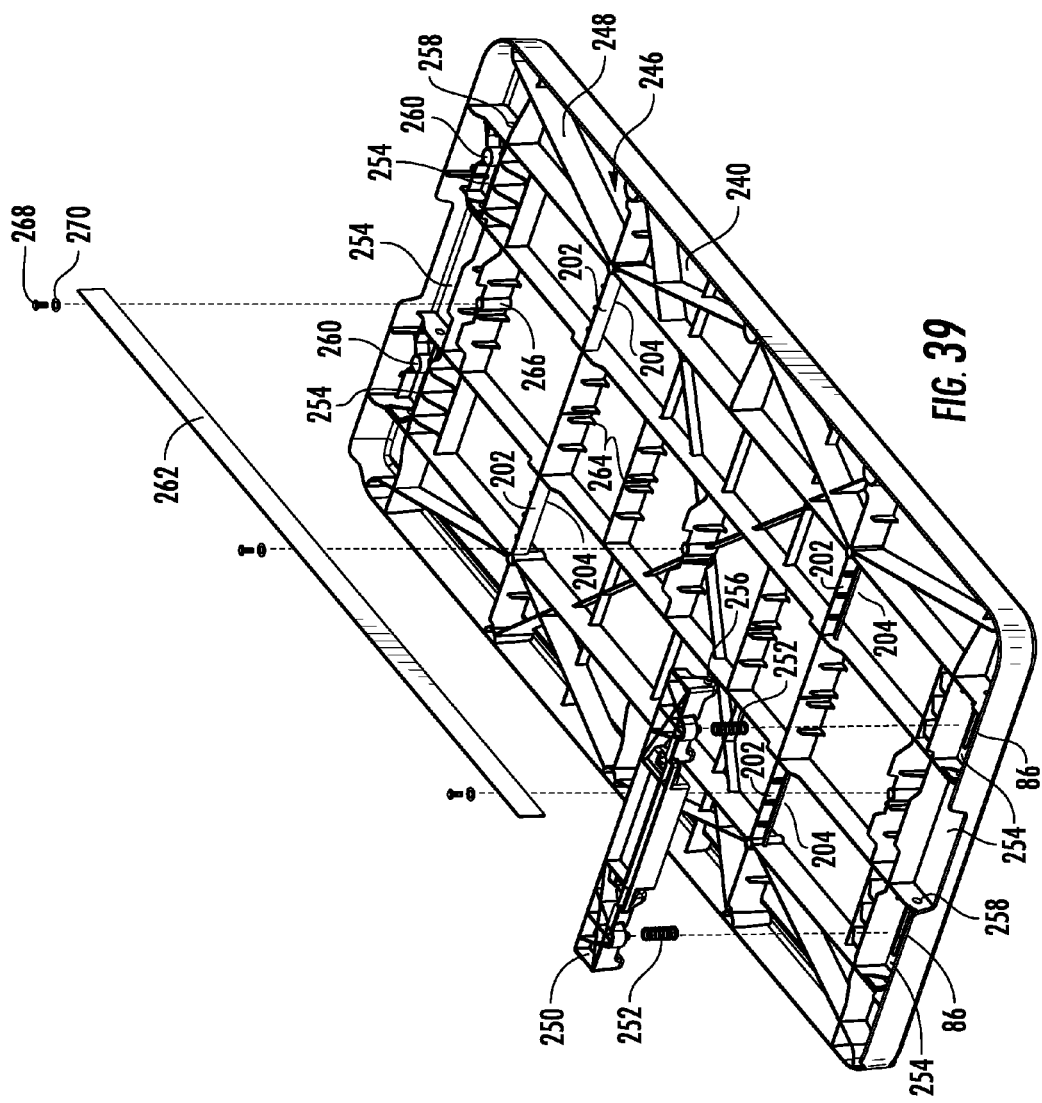
FIG. 39 is an exploded bottom perspective view of the shelf shown in FIG. 38, including a second embodiment of a clamp.

FIGS. 38-45 show a second embodiment and components of a hanging shelf 82*b* that may also be used as a shelf 82 in the shelving systems 60, 120, 140 described above, or in other shelving systems that employ straps to hang the shelves. The hanging shelf 82*b* has a deck 240 that is substantially rectangular in plan view, but may be other shapes, and has an optional lip 242 at the rear edge to help keep articles on the top surface 244. Four or another plurality of slots 86 may be provided for receiving straps 84 from which the shelf 82*b* is suspended. FIG. 39 shows the bottom surface 246 of the deck 240 with stiffener ribs 248, a clamp 250, and two springs 252 for biasing the clamp 250 to the closed, engaged position. The clamp 250 is received in openings 254 in the deck 240, and has round pivot protrusions or pivot bosses 256 that are received in openings 258 in the ribs 248. The springs 252 are received in cylindrical openings 260 in the deck (similar openings are visible and labeled at the opposite end of the deck). Increasing the number of springs 252 to two per clamp 250 helps to provide additional consistency in the retention of straps 84 from one side to the other. Another clamp 250 will be placed at the opposite end of the deck 240. The straps 84 pass through the slots 86 to allow hanging of one shelf 82*b* beneath another shelf 82*b*, as shown in, for example, FIGS. 1 and 16.

Figure 40:
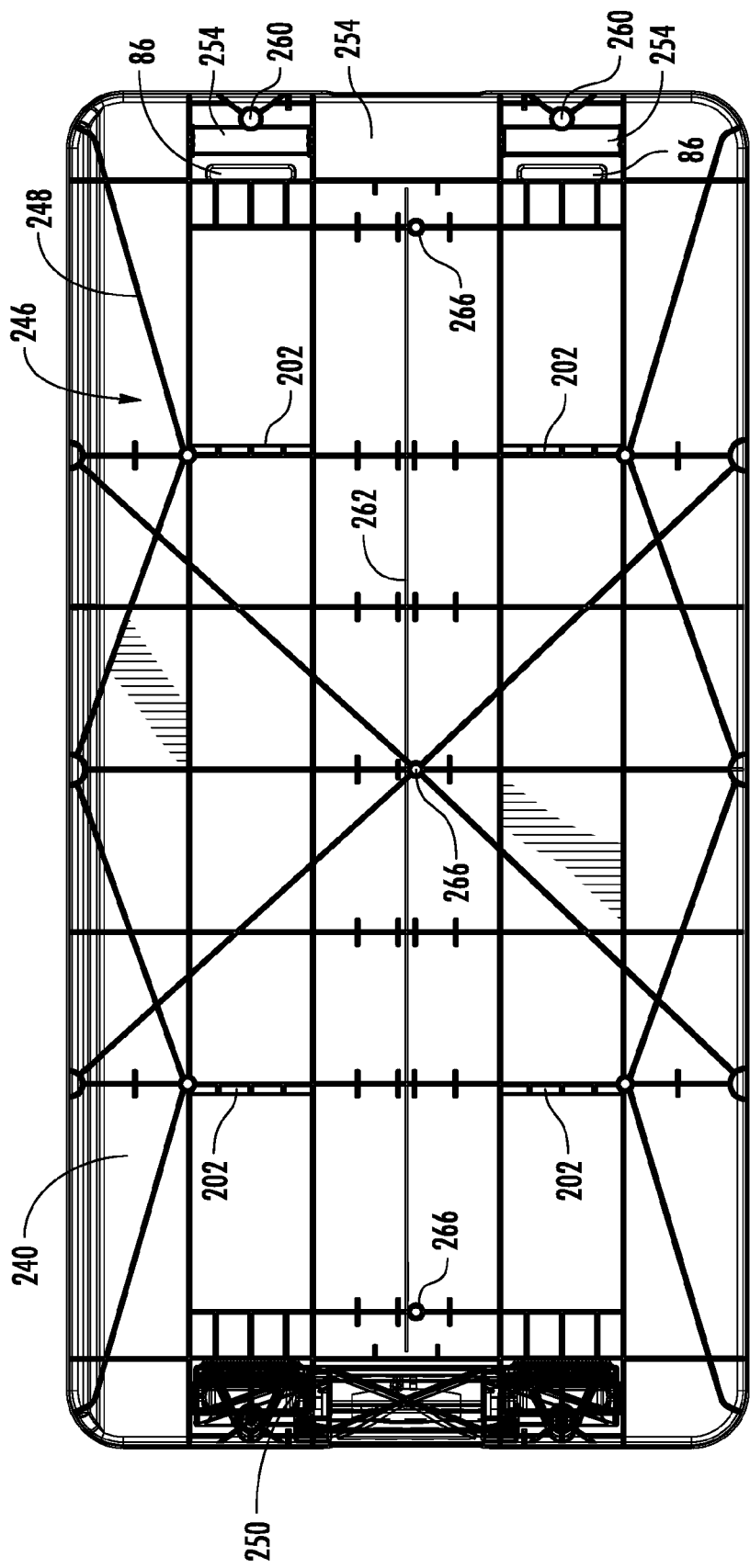
FIG. 40 is a bottom plan view of the shelf shown in FIG. 38.

Elongated strip 262 is provided on the longitudinal axis of the shelf 82*b*. The strip 262 may be, for example, galvanized metal, such as steel. The strip 262 is oriented with its width substantially perpendicular to the top surface 244 of the deck 240 to provide the greatest stiffening effect in the direction of weight bearing on the shelf 82*b*, as well as resistance to creep over time. The strip extends between the clamps 250 in slots 264 in the ribs 248. Cylindrical openings 266 are provided in the middle and at the ends of the strip 262 to receive screws 268. Washers 270 go around the screws and overlap the bottom (top in FIG. 39 orientation) of the strip 262 to secure the strip 262 in the slots 264. Additional strips could be added in various directions to increase the stiffening effect, and the placement of the strips may vary from the central longitudinal axis position shown. A composite shelf with one or more metal strips that act as a beam and that may thereby increase the stiffness of the shelf may provide support for articles with reduced vertical deflection as compared to, for example, an entirely plastic shelf. FIG. 40 further shows the layout of the deck 240, clamp 250 (only one shown), stiffener ribs 248, and strip 262.

Figure 41:
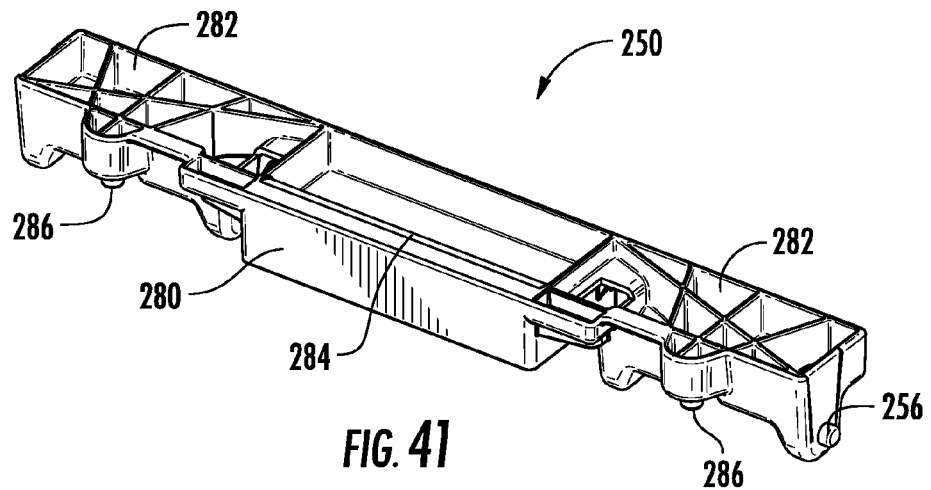
FIG. 41 is a bottom perspective view of the clamp shown in FIG. 39.
Figure 42:
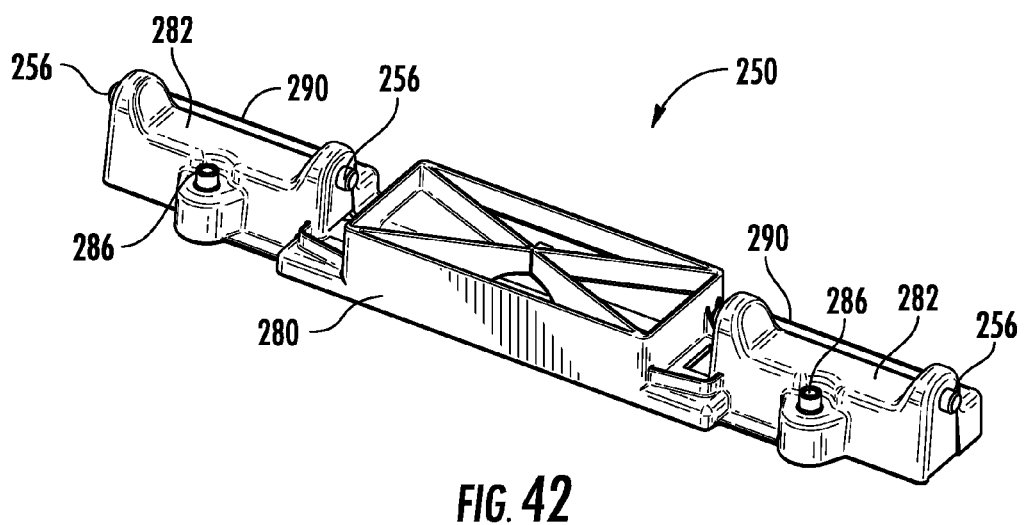
FIG. 42 is a top perspective view of the clamp shown in FIG. 39.
Figure 43:
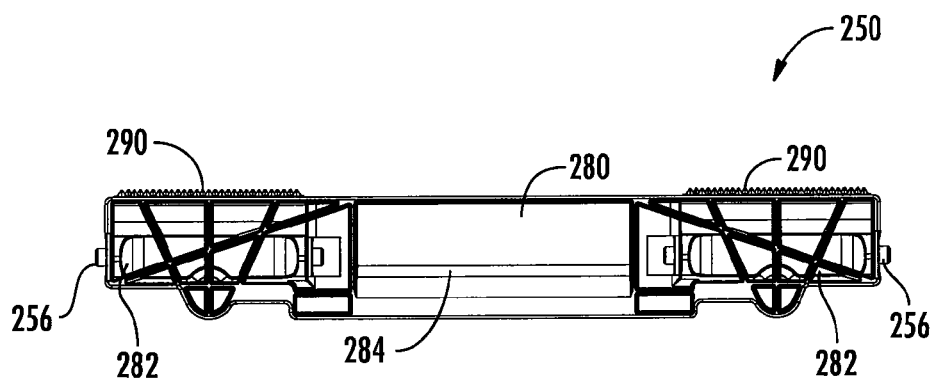
FIG. 43 is a bottom plan view of the clamp shown in FIG. 39.
Figure 44:
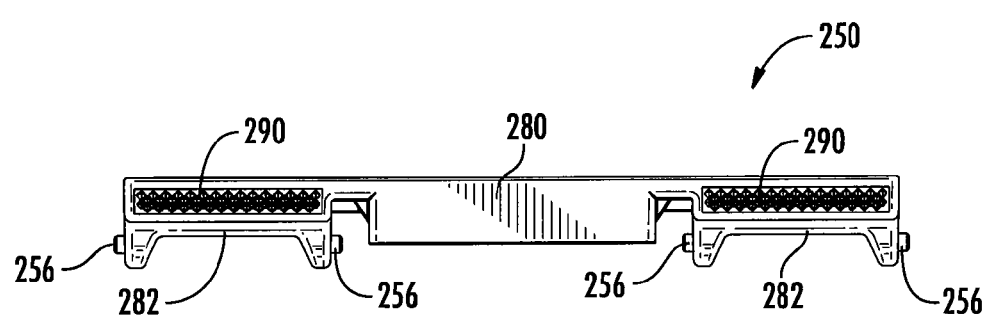
FIG. 44 is a front elevation view of the clamp shown in FIG. 39.
Figure 45:
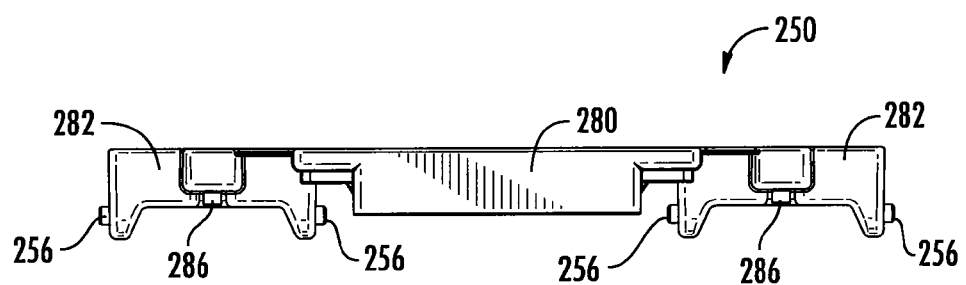
FIG. 45 is a rear elevation view of the clamp shown in FIG. 39.

FIGS. 41-45 show the second embodiment of a clamp 250 in detail. The view of FIG. 41 shows the bottom and rear of the clamp 250, while FIG. 42 shows the top and rear of the clamp 250. The bottom of the clamp 250 is the side that will be facing downward when received in the deck 240. The clamp 250 includes a handle portion 280 and two gripping portions 282. The pivot bosses 256 are provided on each side of the gripping portions 282 and secure the clamp 250 into the deck 240. The handle portion 280 includes a sloped section with an angled interaction surface 284 as an ergonomic design for hand placement. Round spring protrusions 286 are provided for receiving the springs 252 towards the back of the handle portion 280. The gripping portions 282 each include a toothed section 290 that will engage a strap 84 that passes through the adjacent slot 86. As with the first embodiment of a clamp 190, by placing the interaction surface 284 of the clamp 250 at least under the clamp's pivot point (the pivot bosses 256) or inside the pivot point toward the center of the shelf 82*b*, a user's application of force to the interaction surface 284 results in a torque being applied to open the mechanism and release the straps 84.

The construction and positioning of the clamp 250 may be substantially similar to that of the first embodiment of the clamp 190 as shown in FIGS. 35-37, with one difference being the number and locations of the springs 192, 252.

The decks 180, 240 and clamps 190, 250 may be made of a variety of materials, including but not limited to metal and plastic, but in the embodiment shown are contemplated to be molded plastic, including but not limited to acrylonitrile butadiene styrene (ABS), polyethylene, polypropylene, talc filled polypropylene (PP talc), polyvinyl chloride (PVC), polyoxmethylene (POM), styrene acrylonitrile (SAN), or other polymer. Methods of making the clamp 190, 250 may include injection molding for plastic, and die casting for metal, or formed metal. The springs 192, 252 which could include but not be limited to torsional or tension springs, are shown as metal, in particular steel alloy, but could be another metal, a composite, or plastic. Additional materials and manufacturing methods for these parts may also be as selected by one of ordinary skill in the art. The straps 84 may be made of polyester, nylon, cotton webbing, or any other material that permits engagement with the teeth of the clamp, also as selected by one of ordinary skill in the art.

In the embodiments shown, the shelf 82 provides four points of support to receive four straps 84 spaced for stability and strength in hanging the shelf 82. The height of each shelf 82 may be easily adjusted, with the clamp 190 at each end of the shelf 82 allowing for gripping and release of two straps 82. Only one hand is required to simultaneously release the two straps 84 on each end of a shelf 82. When a user presses on the angled interaction surface 214 of the handle portion 210, the toothed portion 220 of the gripping portion 212 rotates away from the engagement surface 222 of the deck 180 and the strap 84, freeing the strap 84 to slide within the slot 86. The shelves 82 may be adjusted such that the top surface 184 of the deck 180 is horizontal, or alternatively, the straps 84 may be secured to provide an angled surface, as may be desirable for shoe storage. The systems 60, 120, 140 may be applied to a new support shelf installation or retro-fit to an existing installation.

Although the present invention has been shown and described in considerable detail with respect to only a few exemplary embodiments thereof, it should be understood by those skilled in the art that there is no intent to limit the invention to the embodiments since various modifications, omissions, and additions may be made to the disclosed embodiments without materially departing from the novel teachings and advantages of the invention, particularly in light of the foregoing teachings. For example, some of the novel features of the shelving system and components could be applied to other types of support apparatus, whether related to shelving or otherwise. Accordingly, it is intended to cover all such modifications, omission, additions, and equivalents as may be included within the spirit and scope of the invention as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A shelf for hanging from a plurality of straps, the shelf comprising:
   a deck having a first end and a second end, the deck defining a plurality of slots adapted to allow the straps to pass through; and
   a first clamp mounted to the deck, the first clamp having a first position for engaging at least one strap at an associated slot, and a second position for allowing the at least one strap to slide in the associated slot,
   wherein the first clamp is resiliently biased and comprises a handle portion and at least one gripping portion including teeth for engaging the at least one strap,
   wherein when the handle portion is actuated, the gripping portion releases the at least one strap.

2. The shelf of claim 1, wherein the first clamp pivots about an axis from the first position to the second position upon application of force to the handle portion.

3. The shelf of claim 2, wherein each handle portion comprises a sloped section including an angled interaction surface for application of force by a user's hand, wherein upon application of force to the angled interaction surface, torque is applied to cause the gripping portion to release the at least one strap.

4. The shelf of claim 3, wherein the angled interaction surface of the first clamp is at least as far from the end of the shelf proximate to the first clamp as the axis of pivoting of that clamp.

5. The shelf of claim 1, wherein the first clamp is resiliently biased and comprises a handle portion and two gripping portions, and in the first position is adapted to engage two straps, wherein when the handle portion is actuated, the gripping portion releases the two straps.

6. The shelf of claim 1, wherein the first clamp is mounted to the shelf at the first end of the shelf and a second clamp substantially the same as the first clamp is mounted to the shelf at the second end of the shelf.

7. The shelf of claim 1, wherein the deck comprises:
   a first portion comprising a first material; and
   an elongated second portion mounted to the first portion and comprising a second material,
   wherein the elongated second portion provides stiffening in the direction of weight bearing on the shelf.

8. The shelf of claim 7, wherein the elongated second portion comprises a strip.

9. The shelf of claim 8, wherein the strip comprises metal and acts as a beam.

10. A shelving system for mounting to a fixed shelf that is in a substantially fixed position, the shelving system comprising:
    a bracket that engages the fixed shelf;
    at least one strap depending from the bracket; and
    a shelf releasably attached to the at least one strap the shelf comprising:
       a deck having a first end and a second end, the deck defining a plurality of slots adapted each to allow at least one strap to pass through; and
       a first clamp mounted to the deck, the first clamp having a first position for engaging at least one strap at an associated slot, and a second position for allowing the at least one strap to slide in the associated slot,
       wherein the first clamp is resiliently biased and comprises a handle portion and at least one gripping portion including teeth for engaging the at least one strap,
       wherein when the handle portion is actuated, the gripping portion releases the at least one strap.

11. The shelving system of claim 10, wherein the bracket is free to disengage the shelf.

12. The shelving system of claim 10, wherein the first clamp pivots about an axis from the first position to the second position upon application of force to the handle portion.

13. The shelving system of claim 12, wherein each handle portion comprises a sloped section including an angled interaction surface for application of force by a user's hand, wherein upon application of force to the angled interaction surface, torque is applied to cause the gripping portion to release the at least one strap.

14. The shelving system of claim 13, wherein the angled interaction surface of the first clamp is at least as far from the end of the shelf proximate to the first clamp as the axis of pivoting of that clamp.

15. The shelving system of claim 10, wherein the first clamp is resiliently biased and comprises a handle portion and two gripping portions, and in the first position is adapted to engage two straps, wherein when the handle portion is actuated, the gripping portion releases the two straps.

16. The shelving system of claim 10, wherein the first clamp is mounted to the shelf at the first end of the shelf and a second clamp substantially the same as the first clamp is mounted to the shelf at the second end of the shelf.

* * * * *